United States Patent
Yu et al.

(10) Patent No.: US 12,468,987 B2
(45) Date of Patent: Nov. 11, 2025

(54) SYSTEM AND METHOD FOR EFFICIENT TRANSFORMATION PREDICTION IN A DATA ANALYTICS PREDICTION MODEL PIPELINE

(71) Applicant: International Business Machines Corporation, Armonk, NY (US)

(72) Inventors: Dong Hai Yu, Xian (CN); Jun Wang, Xi'an (CN); Bo Song, Xian (CN); Yao Dong Liu, Xian (CN); Jiang Bo Kang, Xian (CN); Lei Tian, Xi'an (CN); Xing Wei, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 17/739,716

(22) Filed: May 9, 2022

(65) Prior Publication Data

US 2023/0359941 A1    Nov. 9, 2023

(51) Int. Cl.
*G06N 20/20* (2019.01)
*G06Q 20/40* (2012.01)

(52) U.S. Cl.
CPC ......... *G06N 20/20* (2019.01); *G06Q 20/4016* (2013.01)

(58) Field of Classification Search
CPC ..... G06N 20/00; G06Q 20/4016; G06Q 40/00
See application file for complete search history.

(56) References Cited

U.S. PATENT DOCUMENTS

| | | | |
|---|---|---|---|
| 7,266,537 B2 | 9/2007 | Jacobsen et al. | |
| 10,482,351 B2 | 11/2019 | Ishii | |
| 2018/0018538 A1* | 1/2018 | Ishii | G06F 18/2135 |
| 2021/0160266 A1* | 5/2021 | Sternby | G06N 5/04 |

(Continued)

FOREIGN PATENT DOCUMENTS

WO    2021101463 A1    5/2021

OTHER PUBLICATIONS

Brownlee, J. "Feature Importance and Feature Selection With XGBoost in Python", XGBoost, Aug. 31, 2016, 50 pages.
(Continued)

*Primary Examiner* — Grace Park
(74) *Attorney, Agent, or Firm* — Scully, Scott, Murphy & Presser, P.C.

(57) ABSTRACT

A computer-implemented system, platform, programing product, and/or method for improving transformation selection in an ensemble machine learning (ML) model that includes: providing all base ML models of the ensemble ML model; identifying all of a plurality of Derived Fields in all the base ML models; performing a Derived Field run prediction analysis for all the Derived Fields; computing the Derived Field Importance Weight for Field (DFIW4F) and the Derived Field Importance Weight for Model (DFIW4M) for all the Derived Fields; clustering all the Derived Fields into a plurality of Derived Field clusters, wherein each Derived Field cluster is based upon the DFIW4M and the DFIW4F for the Derived Field; sorting all the Derived Field clusters by best cluster based upon DFIW4M and DFIW4F;

(Continued)

and running the base ML models based upon the Derived Fields in the best Derived Field cluster until sufficient base ML models have been run.

19 Claims, 16 Drawing Sheets

(56) References Cited

U.S. PATENT DOCUMENTS

2023/0124411 A1\* 4/2023 Sommer ................ G06N 3/045
　　　　　　　　　　　　　　　　　　　　　　　706/12

OTHER PUBLICATIONS

Brownlee, J. "Develop a Bagging Ensemble with Different Data Transformations", Ensemble Learning, Nov. 16, 2020, 20 pages.
Sajid, S., et al., "Predictive Data Transformation Suggestions in Grafterizer Using Machine Learning", Research Gate, Oct. 2019, 13 pages.

\* cited by examiner

| To | Target Type | NOI | Inputs | Func_name | Func_depth |
|---|---|---|---|---|---|
| DerivedField_1 | string | 2 | V1, V3 | ColumnSelector | 1 |
| DerivedField_2 | real | 1 | V5 | ReplaceMissingVlaues | 2 |
| DerivedField_3 | int | 1 | V8 | Imputer | 1 |
| DerivedField_4 | string | 1 | V9 | StandardScaler | 2 |
| DerivedField_5 | real | 3 | V1, V3, V9 | Product | 3 |
| DerivedField_6 | int | 5 | V1, V2, V3, V8, V9 | ABS | 1 |
| DerivedField_7 | string | 5 | V1, V2, V4, V8, V9 | TA2 | 2 |
| DerivedField_8 | real | 5 | V1, V2, V5, V8, V9 | FS1 | 2 |

575

976

585

| Size | To | Target Type | NOI | Inputs | Func_name | Func_depth | Run_time |
|---|---|---|---|---|---|---|---|
| L | DerivedField_1 | string | 2 | V1, V3 | ColumnSelector | 1 | 1 |
| M | DerivedField_2 | real | 1 | V5 | ReplaceMissingVlaues | 2 | 2 |
| S | DerivedField_3 | int | 1 | V8 | Imputer | 1 | 5 |
| M | DerivedField_4 | string | 1 | V9 | StandardScaler | 2 | 3 |
| L | DerivedField_5 | real | 3 | V1, V3, V9 | Product | 3 | 3 |
| ML | DerivedField_6 | int | 5 | V1, V2, V3, V8, V9 | ABS | 1 | 2 |
| S | DerivedField_7 | string | 5 | V1, V2, V4, V8, V9 | TA2 | 2 | 5 |
| L | DerivedField_8 | real | 5 | V1, V2, V5, V8, V9 | FS1 | 2 | 2 |

| Size | Model | Input DF 1 | Input DF 2 | Input DF 3 | Total RT |
|---|---|---|---|---|---|
| L | M1 | DerivedField_1 | DerivedField_3 | DerivedField_3 | 8 |
| M | M2 | DerivedField_1 | DerivedField_3 | | 6 |
| S | M3 | DerivedField_3 | DerivedField_4 | | 5 |
| M | M4 | DerivedField_1 | DerivedField_6 | | 5 |
| L | M5 | DerivedField_3 | DerivedField_6 | | 5 |
| ML | M6 | DerivedField_6 | | | 2 |
| S | M7 | DerivedField_8 | | | 1 |
| L | M8 | DerivedField_8 | | | 1 |

FIG. 13

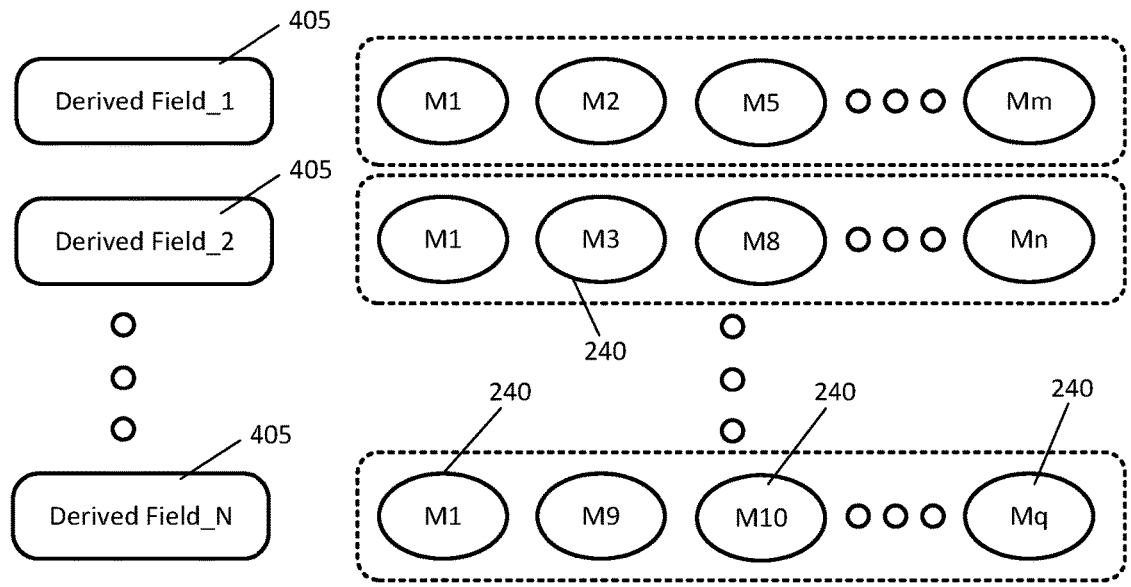
FIG. 16
| Dervived Field | DF_1 | DF_2 | DF_3 | DF_4 | DF_5 | DF_6 | DF_7 | DF_8 |
|---|---|---|---|---|---|---|---|---|
| DFIW4M | 0.0123 | 0.345 | 0.789 | 0.123 | 0.123 | 0.89 | 0.11 | 0.23 |
| DFIW4F | 0.02 | 0.03 | 0.05 | 0.02 | 0.02 | 0.02 | 0.01 | 0.02 |
FIG. 17
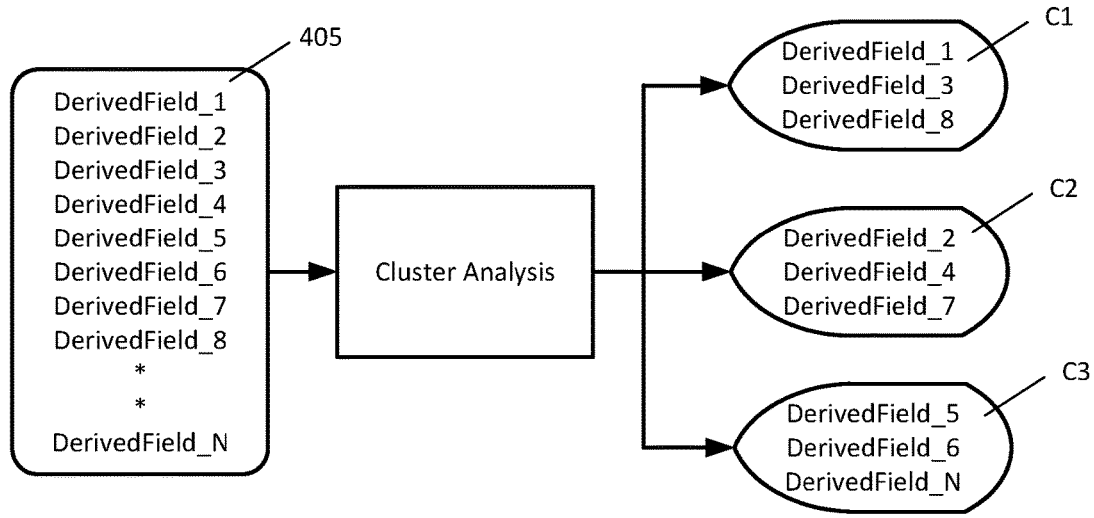
FIG. 18

| To | cluster |
|---|---|
| DerivedField_1 | c1 |
| DerivedField_2 | c2 |
| DerivedField_3 | c1 |
| DerivedField_4 | c2 |
| DerivedField_5 | c3 |
| DerivedField_6 | c3 |
| DerivedField_7 | c2 |
| DerivedField_8 | c1 |

1900

| Cluster | M_DFIW4M | M_DFIW4F |
|---|---|---|
| c1 | 0.3 | 0.2 |
| c2 | 0.9 | 0.9 |
| c3 | 0.9 | 0.3 |

2100

SYSTEM AND METHOD FOR EFFICIENT TRANSFORMATION PREDICTION IN A DATA ANALYTICS PREDICTION MODEL PIPELINE

FIELD

The present application relates generally to electronic information handling and/or data analytics, and more particularly to methods, computer systems, platforms, tools, and computer program products for efficient and improved electronic data transformation for use in a data analytics prediction model pipeline.

BACKGROUND

Feature engineering is the process of using domain knowledge of data to create features that make machine learning (ML) algorithms and models work. If feature engineering is performed correctly, it increases the predicative power of machine learning (ML) models by creating features from raw data that facilitate the machine learning (ML) process. For example, machine learning (ML) models monitor financial transactions and activity of account holders at financial institutions to detect any suspicious activities and/or behavior such as, for example, fraudulent financial transactions. Machine learning (ML) models also monitor insurance claim activity to detect any suspicious activities and/or behavior such as, for example, fraudulent insurance claims. These advanced information and data analytics systems, platforms, and/or methods discover, define, and/or detect for example data patterns within relationship networks, for example, a large-scale network of financial transactions, insurance claims, and the like involving numerous parties and transactions, that are indicative of suspicious activity and behavior that may be indicative of fraudulent and/or criminal behavior.

Data analytics often includes data analytic pipelines, also referred to as ensemble machine learning (ML) models, which apply filters and numerous transformations to the data to obtain input (features) for the machine learning (ML) models. Transformations typically use many derived fields and processing the transformations generally is slow and takes a long time because of the many derived fields. As a result, the prediction or output of the machine learning (ML) model generally takes a long time. The length of time for the machine learning (ML) model to reach its prediction can fail to meet customer expectations, especially in situations where real time scoring/predictions, for example credit card fraud, is important. Detecting activity indicative of fraudulent or criminal activity in a timely manner (e.g., in real time) is increasingly difficult due to the large amount of data and information, such as, for example, numerous financial transactions, numerous parties/entities, and/or numerous insurance claims. It would be advantageous to arrive at predictions from the machine learning (ML) models in a shorter time.

SUMMARY

The summary of the disclosure is given to aid understanding of data analytics pipelines, including for ensemble machine learning (ML) models using transformations that are based upon derived fields, and in an aspect in improving data analytics and machine learning (ML) models to arrive at predictions faster, and not with an intent to limit, the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, platform, the architectural structure, and their method of operation to achieve different effects. In this regard it will be appreciated that the disclosure presents and describes one or more inventions, and in aspects includes numerous inventions as defined by the claims.

In one or more embodiments, a system, platform, tool, computer program product, and/or method is disclosed for efficient and improved transformation prediction methods and systems for an ensemble machine learning model are disclosed. A system, platform, tool, computer program product, and/or computer-implemented method for providing transformations for an ensemble machine learning model is disclosed that in an embodiment includes: providing all of a plurality of base machine learning (ML) models of the ensemble machine learning (ML) model; identifying all of a plurality of Derived Fields in all the plurality of base ML models in the ensemble ML model; performing a Derived Field run prediction analysis for all of the plurality of Derived Fields; computing the Derived Field Importance Weight for Field (DFIW4F) for all of the plurality of Derived Fields; computing the Derived Field Importance Weight for Model for all of the plurality of Derived Fields; clustering all the Derived Fields into a plurality of Derived Field clusters, wherein each Derived Field cluster is based upon the DFIW4M and the DFIW4F for the Derived Field; sorting all the Derived Field clusters by best cluster based upon DFIW4M and DFIW4F; and running the base ML models based upon the Derived Fields in the best Derived Field cluster until sufficient base ML models have been run. In an approach, identifying all the Derived Fields in all the base machine learning models includes: receiving all Derived Fields from all the base ML models in the ensemble ML model; obtaining a function name and type of Derived Field for all the received Derived Fields from all the base ML models in the ensemble ML model; obtaining input variables of all the received Derived Fields from all the base ML models in the ensemble ML model; obtaining the Derived Field Type of all the received Derived Fields from all the base ML models in the ensemble ML model; and computing a number of inputs of all the received Derived Fields from all the base ML models in the ensemble ML model.

In one or more embodiments, the system, platform, tool, programming product, and/or computer-implemented method further includes: generating X input values for one or more Input Variables for each Derived Field; running each Derived Field using the X input values generated for the one or more Input Variables for each Derived Field; determining a run time for each of X runs of each Derived Field using one of the X input values generated for the one or more Input Variables for each Derived Field; computing a mean run time for the X runs of each Derived Field; and storing the mean run time for the X runs of each Derived Field in at least one of a group consisting of a Derived Field Record, a Derived Field Table, and a combination thereof. The system, platform, tool, programming product, and/or computer-implemented method in an embodiment further includes computing the DFIW4F for all of the plurality of Derived Fields according to the formula:

$$DFIW4F_N = $$
$$DFRT_{N\_1}/\left(\sum\nolimits_{d=1}^{K}(DFRT_d)\right)/K + DFRT_{N\_2}/\left(\sum\nolimits_{d=1}^{M}(DFRT_d)\right)/M + \ldots +$$
$$DFRT_{N\_y}/\left(\sum\nolimits_{d=1}^{N}(DFRT_d)\right)/N$$

wherein $DFRT_{N\_y}$ is the run time of a Derived Field, where a first subscript N in $DFRT_{N\_y}$ is an index of the Derived Field, a second subscript y in $DFRT_{N\_y}$ is the last index of the base ML model, and N is the number of Derived Fields.

The system, platform, tool, programming product, and/or computer-implemented method according to an approach further includes: receiving a plurality of Derived Field Records; determining whether all the plurality of Derived Field Records have been used to calculate a contribution weight for every base ML model; forecasting, in response to not all the Derived Field Records being used to calculate a value number for every base ML model, an output of each current base ML model by running each current base ML model using one of the plurality of Derived Field records that have not been used to calculate a Tnm value number; comparing the forecasted output of each current base ML model using the one of the plurality of Derived Field Records that have not been used to calculate a Tnm value number to a final predicted value of the ensemble ML model using the one of the plurality of Derived Field records that have not been used to calculate a Tnm value number; assigning, in response to the forecasted output of the current base ML model, using the one of the Derived Records that have not been used to calculate a Tnm value number, being equal to the final predicted value of the ensemble ML Model, using the one of the Derived Records that have not been used to calculate a Tnm value number, a Tnm value number of 1; assigning, in response to the forecasted output of the current base ML model, using the one of the Derived Records that have not been used to calculate a Tnm value number, not being equal to the final predicted value of the ensemble ML Model, using the one of the Derived Records that have not been used to calculate a Tnm value number, a $T_{nm}$ value number of 0; and computing the contribution weight for each base ML model based upon the formula:

$$A_n = (\Sigma_{m=1}^{W}(T_{nm}))/W$$

where $A_n$ is the contribution weight of base ML model n, n is the model number of the base ML model in the ensemble ML model where the ensemble ML model has W base ML models in the ensemble ML model.

According to a further arrangement, the system, platform, tool, programming product, and/or method further includes: obtaining a Derived Field; obtaining the contribution weight for each base ML model; and calculating the DFIW4M for each of the Derived Fields using the formula:

$$DFIW4M_w = (\Sigma_{m=1}^{P}(MW_{wm}))/P$$

where W is the number of the base ML model in the ensemble ML model where the ensemble ML model has P base ML models. The system, platform, tool, programming product, and/or computer-implemented method according to an embodiment further includes computing the DFIW4F for all the Derived Fields according to the formula:

$$DFIW4F_N =$$
$$DFRT_{N\_1}/\left(\sum\nolimits_{d=1}^{K}(DFRT_d)\right)/K + DFRT_{N\_2}/\left(\sum\nolimits_{d=1}^{M}(DFRT_d)\right)/M + \ldots +$$

-continued
$$DFRT_{N\_y}/\left(\sum\nolimits_{d=1}^{N}(DFRT_d)\right)/N$$

wherein $DFRT_{N\_y}$ is the run time of a Derived Field, where a first subscript w in $DFRT_{N\_y}$ is an index of the Derived Field, a second subscript y in $DFRT_{N\_y}$ is the last index of the base ML model, and N is the number of Derived Fields. The system, platform, tool, programming product, and/or computer-implemented method in a further approach further includes: computing a mean DFIW4M for all the Derived Fields in each Derived Field cluster created as a result of clustering the Derived Fields based upon DFIW4M and DFIW4F; computing a mean DFIW4F for all Derived Fields in each Derived Field cluster created as a result of clustering the Derived Fields based upon DFIW4M and DFIW4F; sorting the plurality of Derived Field clusters in descending order based upon the mean DFIW4M for all the Derived Fields in each cluster; and sorting, in response to the mean DFIW4M for one of the plurality of Derived Field clusters equaling the mean DFIW4M for another one of the plurality of Derived Field clusters, the Derived Field clusters having equal DFIW4M by mean DFIW4F for all of the plurality of Derived Fields.

In an embodiment, running the base ML models based upon the Derived Fields in the best Derived Field cluster until sufficient base ML models have been run includes: determining if a sufficient number of Derived Field clusters have been processed; selecting, in response to determining that a sufficient number of Derived Field clusters have not been processed, a best remaining Derived Field cluster that has not been processed; determining whether all Derived Fields in the selected best remaining Derived Field cluster have been processed; choosing, in response to all Derived Fields in the selected best remaining Derived Field cluster not being processed, a chosen Derived Field from the selected best remaining Derived Field cluster; running the base ML models using the chosen Derived Field; and saving a result of the base ML model runs using the chosen Derived Field. The system, platform, tool, programming product, and/or computer-implemented method in an aspect further includes performing the steps of choosing a chosen Derived Field from the selected best remaining Derived Field cluster, running the base ML models using the chosen Derived Field, and saving the result of the base ML model runs using the chosen Derived Field until all Derived Fields from the selected best remaining Derived Field cluster have been processed. In a further aspect, the system, platform, tool, programming product and/or computer-implemented method further includes determining, in response to and after determining that all of the Derived Fields from the selected best remaining Derived Field cluster have been processed, whether a sufficient number of Derived Field clusters have been processed; and selecting a best remaining Derived Field cluster that has not been processed. In one or more approaches, determining whether sufficient clusters have been processed includes comparing the number of base ML model predictions to a threshold; and if the number of base ML model predictions that are correct or incorrect exceeds the threshold, then a sufficient number of clusters have been processed. The system, platform, tool, programming product, and/or method further includes, in one or more embodiments, generating, in response to determining that a sufficient number of clusters have been processed, a final result of an ensemble ML model, where in an embodiment the ensemble ML model includes the base ML models identified by the sufficient number of clusters.

The foregoing and other objects, features, and/or advantages of the invention will be apparent from the following more particular descriptions and exemplary embodiments of the invention as illustrated in the accompanying drawings.

BRIEF DESCRIPTION OF THE DRAWINGS

The various aspects, features, and embodiments of a system, platform, tool, computer program product, and/or method to perform data analytics, including the use of data analytic pipelines and machine learning (ML) models using transformations to arrive at predictions faster will be better understood when read in conjunction with the figures provided. Embodiments are provided in the figures for the purpose of illustrating aspects, features, and/or various embodiments of the systems, platforms, and methods, but the claims should not be limited to the precise arrangement, structures, features, aspects, systems, platforms, tools, modules, functional units, programming, instructions, assemblies, subassemblies, circuitry, embodiments, methods, processes, techniques, and/or devices shown, and the arrangements, structures, features, aspects, systems, platforms, tools, modules, functional units, programming, instructions, assemblies, subassemblies, circuitry, embodiments, methods, processes, techniques, and/or devices shown may be used singularly or in combination with other arrangements, structures, features, aspects, systems, platforms, tools, modules, functional units, instructions, programming, assemblies, subassemblies, circuitry, embodiments, methods, techniques, processes, and/or devices. It should be noted that a numbered element is typically numbered according to the figure in which the element is introduced, is generally referred to by that number throughout succeeding figures, and like reference numbers in the figures often represent like parts of the illustrative embodiments of the invention.

FIG. 12 illustrates a representative example of an updated Derived Field Table according to an embodiment of the disclosure.

FIG. 13 illustrates a representative example of a Table showing the relationship between Derived Fields and base machine learning (ML) models according to an embodiment of the disclosure.

FIG. 16 depicts a block diagram showing for each Derived Field the base machine learning (ML) models that use that Derived Field according to an embodiment of the disclosure.

FIG. 17 illustrates an example Derived Field Weight Table showing the Derived Field Importance Weight for Model (DFIW4M) and Derived Field Importance Weight for Field (DFIW4F) for each Derived Field according to an embodiment of the disclosure.

FIG. 18 depicts a representative block diagram of the Derived Fields undergoing a cluster analysis based upon DFIW4M and DFIW4F.

DETAILED DESCRIPTION

The following description is made for illustrating the general principles of the invention and is not meant to limit the inventive concepts claimed herein. In the following detailed description, numerous details are set forth in order to provide an understanding of a data analytics system, platform, tool, framework, computer program product, method, and/or techniques, including one or more machine learning (ML) models that processes data to arrive at a prediction, and that in an embodiment provides a system, platform, tool, framework, computer program product, method and/or techniques to efficiently predict and/or select data transformations to facilitate efficient ensemble machine learning (ML) models, however, it will be understood by those skilled in the art that different and numerous embodiments of the system, platform, tool, framework, computer program product, and its method of operation may be practiced without those specific details, and the claims and disclosure should not be limited to the arrangements, structures, systems, assemblies, subassemblies, platforms, framework, modules, tools, functional units, circuitry, programming, instructions, embodiments, features, aspects, processes, methods, techniques, and/or details specifically described and shown herein. Furthermore, particular features, aspects, arrangements, structures, systems, assemblies, subassemblies, platforms, frameworks, modules, tools, functional units, circuitry, embodiments, programming, instructions, methods, processes, techniques, details, etc. described herein can be used in combination with other described features, aspects, arrangements, structures, systems, assemblies, subassemblies, platforms, frameworks, modules, tools, functional units, circuitry, embodiments, programming, instructions, techniques, methods, processes, details, etc. in each of the various possible combinations and permutations.

The following discussion omits or only briefly describes conventional features of information processing systems and data networks, including data analytic pipelines and ensemble machine learning (ML) models having and/or containing electronic data analytics programs or base machine learning (ML) models, which should be apparent to those skilled in the art. It is assumed that those skilled in the art are familiar with data processing and data analytics including large scale data processing/analytics (also referred to as information/data processing systems) and their operation, and the application of data analytics, including data analytics systems, tools, platforms, machine-learning models, and/or processes to make predictions, including for example predictions related to suspicious activity that may be indicative of fraud and/or other criminal behavior, for example credit card fraud.

Figure 1:
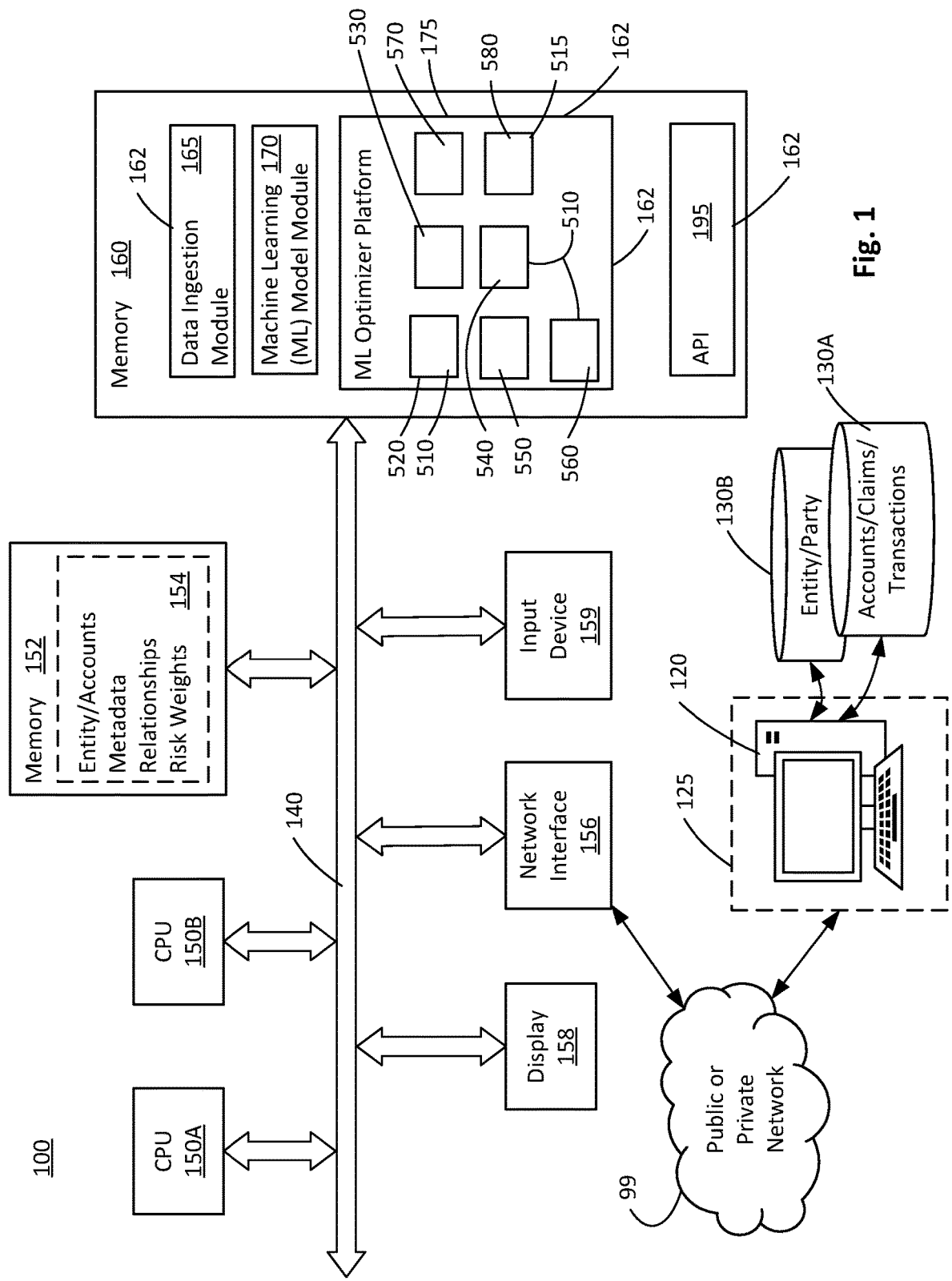
FIG. 1 schematically shows an exemplary computer system/computing device which is applicable to implement one or more embodiments of predicting transformations and or Derived Fields for machine learning (ML) models, including ensemble machine learning (ML) models, which can be used, for example, as a suspicious activity and risk assessment tool.

FIG. 1 illustrates an embodiment of an electronic risk assessment platform or tool 100 for implementing data analytics (e.g., a data analytics platform) and machine learning (ML) models or methods to make predictions, e.g., to detect credit card fraud. In embodiments, such a system or tool 100 may be employed by or for a financial institution (e.g., a bank) or an insurance company who may issue an alert concerning a particular party, organization, and/or transaction(s). The alert may be issued by a financial institution against an entity or party who has been found to participate in suspicious activity, e.g., a bank has found suspicious activity and rejects a credit card transaction. Electronic assessment platform or tool 100 according to an embodiment can be a computer system, a server, computing device, personal computer, laptop, tablet, smart device, mobile device, smart phone, or any other similar computing device configured to run risk assessment software applications and models.

Risk assessment tool 100, also referred to as a system or platform, includes one or more hardware processors 150A, 150B (also referred to as central processing units (CPUs), a memory 160, e.g., for storing an operating system, application program interfaces (APIs) and program instructions, a network interface 156, a display device 158, an input device 159, and can include any other features common to a computing device. In some aspects, risk assessment tool or system 100 may, for example, be any computing device that is configured to communicate with one or more networks 125 or web-sites 125 including a cloud-based server 120 over a public or private communications network 99. For instance, network or web-site 125 may include a financial institution that records/stores information, e.g., financial transactions occurring between numerous parties (entities). Network or web-site 125 can also include an insurance organization or syndicate that records/stores information, e.g., multiple insurance claims occurring between and involving multiple parties and multiple transactions. Such electronic transactions and/or claims can be stored in a database 130A with associated financial account and/or claims information while entity and party information can be stored in related database 130B. Further, as shown as part of system 100, there can be a local memory and/or an attached memory storage device 152, or a remote memory storage device, e.g., a database, accessible via a remote network connection for input to the system 100.

In the embodiment depicted in FIG. 1, processors 150A, 150B may include, for example, a microcontroller, Field Programmable Gate Array (FPGA), or any other processor that is configured to perform various operations. Communication channels 140, e.g., wired connections such as data bus lines, address bus lines, Input/Output (I/O) data lines, video bus, expansion busses, etc., are shown for routing signals between the various components of system 100. Processors 150A, 150B are configured to execute instructions as described below. These instructions may be stored, for example, as programmed modules in an associated memory storage device 160.

Memory 160 may include, for example, non-transitory computer readable media in the form of volatile memory, such as random-access memory (RAM) and/or cache memory or others. Memory 160 may include, for example, other removable/non-removable, volatile/non-volatile storage media. By way of non-limiting examples only, memory 160 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/ e-ink display, an organic LED (OLED) display, or other similar display technologies. Display 158 optionally may be touch-sensitive and may also function as an input device. Input device 159 may include, for example, a keyboard, a mouse, a touch-sensitive display, a keypad, a microphone, or other similar input devices or any other input devices that may be used alone or together to provide a user with the capability to interact with the computing device 100.

With respect to configuring the computer system as a data analytics tool 100 for running machine learning (ML) models to make predictions, e.g., detect credit card fraud, the local or remote memory 150 may be configured for storing information and associated meta-data 154. Such captured and stored data 154 can include but is not limited to: parties, accounts, transactions, claims, relationships, and associated metadata obtained from transactions, claims, and/or data stored in the electronic databases 130A, 130B. Alternately or in addition, the entity data, entity relationships, transactional data and meta-data 154 can be stored in a separate local memory storage device attached to the computer system 100.

Memory 160 of system 100 in one or more embodiments stores modules and/or platforms that include or constitute one or more modules, applications and/or programs 162 having programmed instructions adapted to perform data analytics using for example one or more machine learning (ML) models to make predictions, e.g., whether a credit card transaction is suspicious.

In an embodiment, one of the modules 162 stored at the associated memory 160 includes a data ingestion module 165 that provides instructions and logic for operating circuitry to access/read large amounts of data (e.g., parties, accounts, transactions, claims data) for use by other modules that process and analyze the data to form and output predictions. In one or more embodiments, the input data for data ingestion module 165 comprises parties, accounts, transactions, claims, etc. For example, where a financial institution desires to determine if there is a suspicious transaction, the input data can comprise: the current transaction, the merchant, the account holder, pervious transactions, account holder profile information, etc. In the case of an insurance organization and the like, the input data for an insurance claim can comprise: the parties doing business with the insurance organization; the claims made with the insurance organization; policy information (the customers) of the insurance organization, the identity of any agencies or brokers that were involved in underwriting the policy, and any parties involved in treating the claim, e.g., auto body shop fixing the motor vehicle, physician treating patient, etc. The examples above are not limiting and there can be other situations where the system, tool, or platform 100 will have application, and additional or other input data can be provided.

Memory 160 in one or more embodiments includes Machine Learning (ML) Model Module 170 which can include contain and call up one or more models, for example machine learning (ML) models to process and analyze the data and provide associated predictions. Machine Learning (ML) Model Module 170 contains and/or provides instructions and logic for operating circuitry to process and analyze data, typically large amounts of data, to form and/or create data analytics pipelines or ensemble machine learning (ML) models that use one or more base machine learning (ML) models, to make predictions. ML Model Platform/Module 170 can include and invoke, for example, an ensemble machine learning (ML) model for detecting suspicious activity, e.g., credit card fraud, as known in the art.

The ensemble machine learning (ML) model can include numerous base machine learning (ML) models. The ML Platform/Module 170, in an embodiment can include, for example, regression models, clustering models, Risk-by-Association models that run a probabilistic risk model to generate risk-by-association analysis scores, and/or pattern determination models that detect data patterns indicative of suspicious activity or behavior in the transaction network. Based on features, data, and metadata relating to a party, transactions, claim data, environmental data, industry data, location data, other data, and changes to the data that are captured, techniques employing Hidden Markov Models or Artificial Neural Networks may alternatively or additionally be employed to compute a risk associated with a particular party, a transaction, claim, and/or changes in data states. Machine Learning (ML) Model Module 170 is shown in FIG. 1 as a separate module/model from the ML Optimizer Platform 175 described herein but can also be a part of ML Optimizer Platform 175. Each of the machine learning (ML) models contain instructions and logic for operating circuitry to perform their respective functions as would be appreciated by one of skill in the art.

In an embodiment, ML Model Module 170 includes an optional graph and build module/model, e.g., in memory 160, and provides instructions and logic for operating circuitry to form/build graphs, e.g., relationship networks, for use in making predictions and/or read data from graphs. Graph & Build module is described as included within the ML Platform 170 but can be a separate module/model from the ML Platform 170. Other modules or models can include further rules models. Further details and explanation of the ML Platform 170 is discussed below, and the ML Platform 170 is not limited to the modules or models discussed above as any number of models/modules can be used in the ML Platform 170.

Memory 160 in an embodiment as shown in FIG. 1 further includes an ML Optimizer Platform 175. ML Optimizer Platform 175 includes one or more programs, applications, and/or modules 510, including as shown for example in FIG. 1, a Derived Field (DF) Extractor 520, a Derived Field (DF) Run Time Predictor 530, a Derived Field (DF) Importance Weight Maker 540, a Weighted Model and Derived Field (DF) Adjuster 550, and a Predictor (e.g., a ML Model Executor) 560. Each of the modules, programs, and/or applications 510 contains instructions and logic for operating circuitry to perform the actions and functions described herein. ML Optimizer Module 175 can optionally include one or more databases 515, including Derived Field (DF) Table Data Base (DB) 570 and/or Updated Derived Field (DF) Table Data Base (DB) 580 as shown in FIG. 1. Modules 510 and databases 515 will be described in more detail in connection with FIG. 5. ML Optimizer 175 is shown as having the modules 510 (e.g., programs) and/or databases 515 as shown in FIG. 1, however, it can be appreciated that more, less, and/or different modules 10 and/or databases 515 can be included in ML Optimizer Module 175. ML Optimizer Platform/Module 175 is shown as a separate module, but it also can be appreciated that ML Optimizer Platform 175, and/or one or more of the modules 510, and/or one or more of the databases 515, can be incorporated in the ML Module 170.

In an aspect, the ingestion module 165 would load the received input data, the ML Module 170 and the ML Optimizer Module 175 determines and/or selects input data, which may, for example, be party data, account data, transaction data, claim data, industry data, geographical data, and other data, including metadata, and creates an analytical pipeline or ensemble machine learning (ML) Model that includes filters, transformations, and one or more base machine learning (ML) models to form a prediction. In most instances, large amounts of data are input and processed by the data ingestion module 165. Memory 160 optionally includes a supervisory program having instructions for configuring the system 100 to call or invoke one or more, and in an embodiment all, of the program modules 162 and invoke the data analytic pipeline operations to make and/or determine a prediction. In an embodiment, the supervisory program calls methods and provides application program interfaces (APIs) for running ML Module/Platform 170 and/or ML Optimizer framework 175 for efficiently creating predictions using the data ingested by the data ingestion module 165. The Data Ingestion Module 165, the ML Model Module 170 and ML Optimizer Framework 175 in an approach is invoked by an API 195 to receive input data from for example a financial institution, generate the data analytics pipeline using for example the Machine Learning Module 170, and optimize the Machine Learning Model(s) using the ML optimizer Model Module 175 to shorten the run time to arrive at a prediction (e.g., arrive at a scoring performance) by the ensemble machine learning (ML) model.

Figure 2:
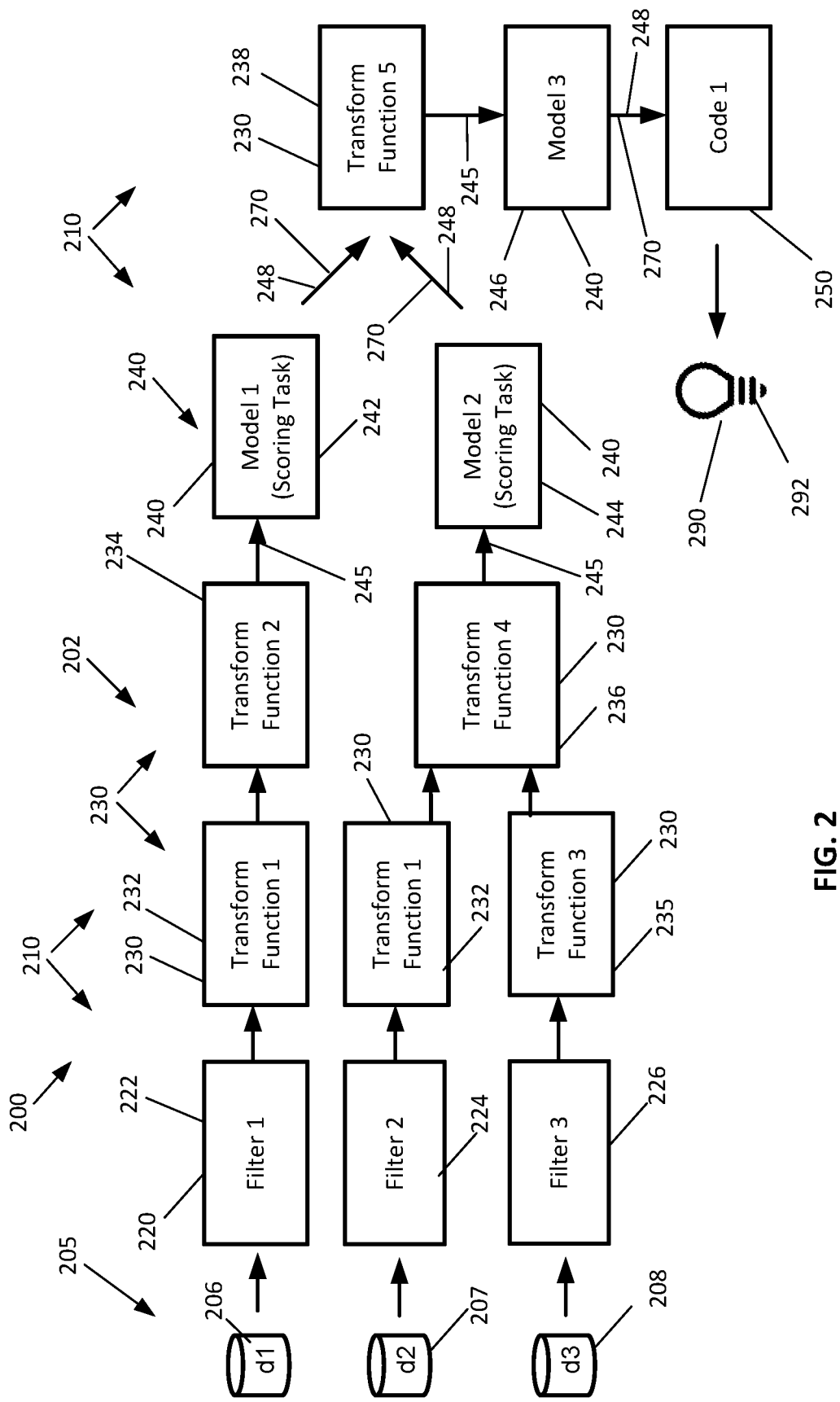
FIG. 2 schematically illustrates an overview of a block diagram of a data analytics pipeline or ensemble machine learning (ML) model in accordance with an embodiment of the disclosure.

The Machine Learning Module 170 in an example is designed and configured to create and/or run a data analytics pipeline that generates a prediction score, e.g., for a financial transaction. FIG. 2 illustrates a data analytics execution pipeline or ensemble machine learning (ML) model 200 generated and/or created by ML Model Platform 170. Pipeline 200 in an embodiment includes receiving and/or ingesting data 205, illustrated as input data subset or record 206 (d1), input data subset or record 207 (d2), and input data subset or record 208 (d3) in FIG. 2. It can be appreciated that the amount of data can and likely is much larger and numerous than the data 205 illustrated in FIG. 2. The analytics pipeline or ensemble ML model 200 can include one or more tasks 210, for example one or more filters 220, one or more Transform Functions 230, one or more base machine learning (ML) Models 240, and one or more Code Units 250 to process the data 205 and produce, generate, and/or output a prediction 290. The analytics pipeline 200 illustrates a flow that takes data 205 as an input and performs a number of tasks 210 to process the data to generate an output 290, which can optionally include a score and/or prediction 292.

Analytics pipeline (e.g., ensemble ML model) 200 includes one or more filters 220, illustrated as Filter 1 (222), Filter 2 (224), and Filter 3 (226) in FIG. 2, that are applied to the data 205, e.g., to data d1 (206), data d2 (207), and data d3 (208). Filters 220 process the data 205 or data subsets (e.g., 206), for example, by filtering rows and columns, to obtain the desired data or data subsets in, for example, the desired format. Different filters 220 can be applied to different data as shown in FIG. 2, the same filter 220 can be applied to different data, or the different filter 220 can be applied to the same data. The data analytics pipeline 200 can apply one or more transform functions or transformations 230 which further process and transform the data. One example of a transformation 230 can be an "aggregate" function, which aggregates the transactions for a period of time. Another example can be a simple function which computes whether the purchase date is a weekday or a weekend, and whether during business hours or after business hours. In pipeline 200, the Transform Functions 230 are Transform Function 232 (Transform Function 1), Transform Function 234 (Transform Function 2), Transform Function 235 (Transform Function 3), Transform Function 236 (Transform Function 4), and Transform Function 238 (Transform Function 5). More or less Transform Functions 230 can be used in analytics Pipeline (e.g., the ensemble ML model) 200.

Different base machine learning (ML) models 240 can be applied in execution pipeline 200. The one or more filters 220 and one or more Transform Functions 230 generate one or more feature sets 245 that are input and/or submitted to the one or more base machine learning (ML) models 240. The one or more features or feature sets 245 includes data 205 that has been filtered, selected, and transformed by transformations 230 into a form for use by the selected base machine learning (ML) model 240. In other words, the various base machine learning (ML) models 240 desire and/or require certain data in a certain format in order to run and generate an output 248. In analytics pipeline 200, for example, the feature 245 (e.g., feature 1) output from Transform Function 234 is fed into Model 242 (Model 1) to generate output 248.

The base machine learning (ML) models 240, also referred to as programs 240, in one or more embodiments receive input as feature set 245 and will output or generate, depending upon the amount of processing performed by the model 240, insights 270, predictions 290, and/or values (data) 248 that can, for example, be further processed to create predictions 290. In an embodiment, the output from the ML Module 170 and/or analytic pipeline 200 is a prediction 290, and the prediction 290 in one or more aspects is output directly from the one or more base ML models 240. Additionally, or alternatively, the output from the one or more base ML models 240 can be one or more insights 270 that are used to generate one or more predictions 290. The base machine learning (ML) models 240 can be, for example, a risk-by-association analyzer, a pattern determination model, a rules model, a regression model, etc. More or less base ML models 240 are contemplated, and pipeline 200 is illustrated with three base ML models 240, e.g., Model 242 (Model 1), Model 244 (Model 2) and Model 246 (Model 3).

Optional Code 250 in pipeline 200 may be applied to further convert the data. For example, code 250 can be a look-up table to score the output of the case. Base ML Model 246 (Model 3) in pipeline 200 can output a numeric score or value and Code 1 250 can determine if the numerical score or value is above a threshold, and if so can generate or output a prediction 290. It should be recognized that the output of the pipeline 200, or the base ML model 240 may be in the form of "low" risk, "medium risk", or "high" risk, but it should be recognized that the output can be in other forms or formats. In one or more embodiments, input data 205 is fed into the ML platform 170, and in an embodiment into analytics pipeline 200, where the input data 205 is converted into features 245 that are fed into one or more base ML models 240 where in one or more aspects the one or more base ML models 240 generate an output 248 as one or more performance scores 292, and one or more performance scores 292 are used to generate a prediction 290.

It should be recognized that analytical Pipeline 200 can include one or more execution pipelines, or sub-branches 202, that perform one or more tasks 210. For example, Filter 222 (Filter 1), Transform Function 232 (Transform Function 1), Transform Function 234 (Transform Function 2), and base ML Model 242 (Model 1) illustrates execution sub-pipeline 202. Each sub-pipeline 202 can have different task/functional units that undergo different tasks 210, e.g., different filters, different transform functions, and/or different models, but can also share filters, transform functions, models, and data. For example, each pipeline will take or use different data and perform different tasks 210 to process the data differently to identify potential suspicious activity. For example, the auto pipeline takes all auto insurance claims as input data and the worker's compensation pipeline is fed with worker's compensation claims.

Figure 3:
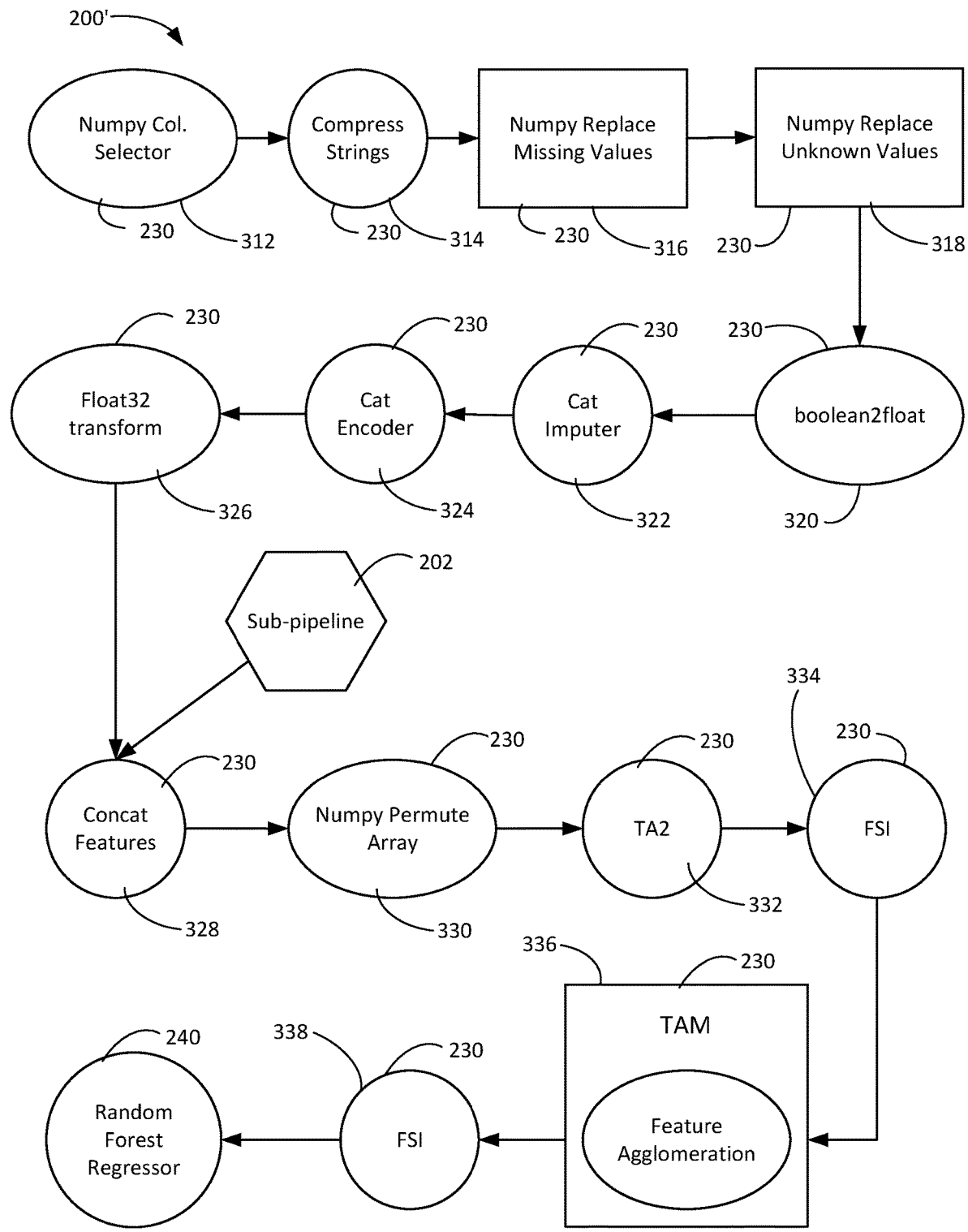
FIG. 3 schematically illustrates an overview block diagram of a base machine learning (ML) according to an embodiment of the disclosure.

FIG. 3 illustrates a block diagram of another embodiment of a data analytics pipeline 200' that includes a number of transformations 230, data analytics subbranch (sub pipeline) 202, and base machine learning (ML) model 240. Transformations 230 can include, for example, Numpy Column Selector 312, Compress Strings 314, Numpy Replace Missing Values 316, Numpy Replace Unknown Values 318, Boolean2 Float 320, Cat Imputer 322, Cat Encoder 324, Float32 Transform 326, Concat Features 328, Numpy Permute Array 330, TA2 332, FSI 334 & 338, and Feature Agglomeration 334. Other transformations 230 include, for example, Relational, Scan, Map, Mean, Minimum, Sum, Merge, Variance, Distinct Count, Count, Expressions, Float Str2 Float, Num Imputer, Opt Standard Scaler, Divide, and Reduce, to name a just a few more Transformations. Other transformations are contemplated. Each derived field can for example implement a different transformation.

Figure 4:
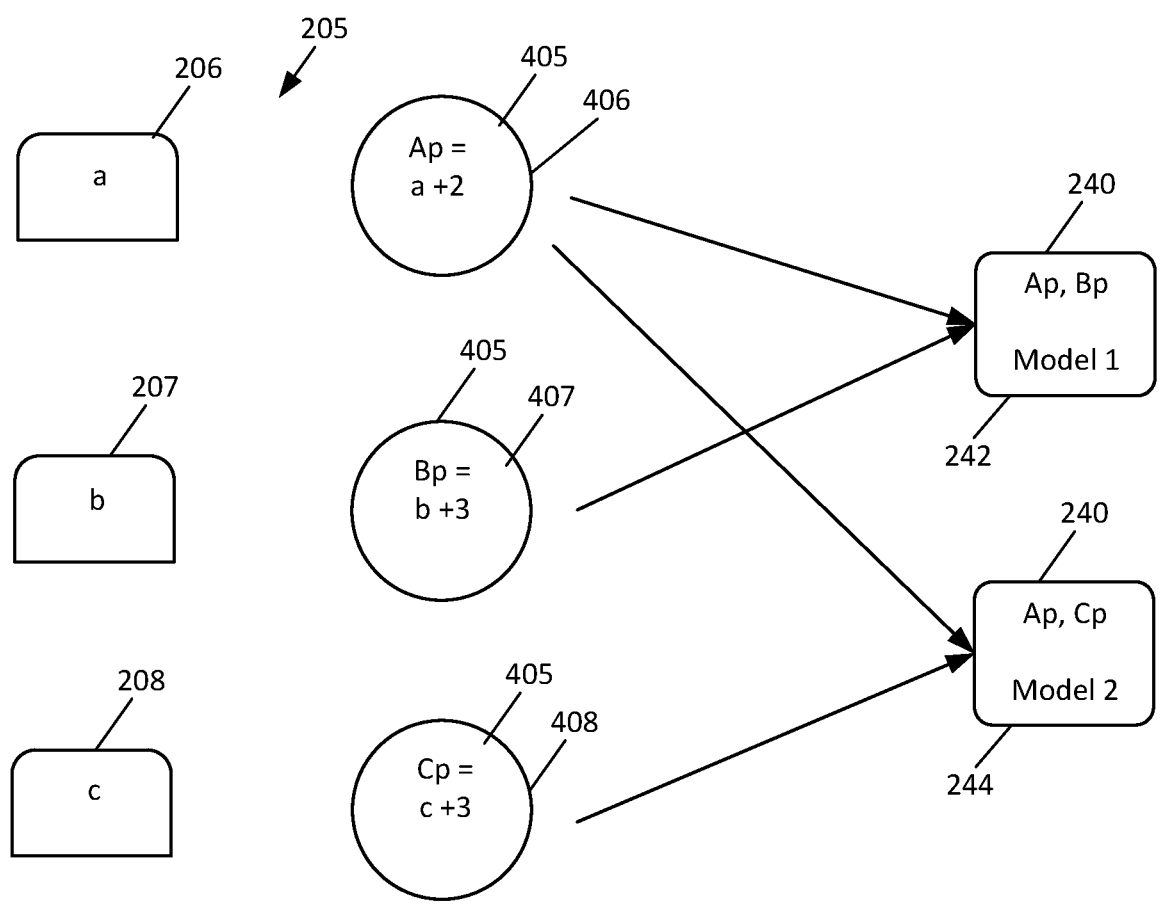
FIG. 4 schematically illustrates the relationship between input data, Derived Fields, and base machine learning (ML) models according to an embodiment of the disclosure.

The data analytics pipelines, e.g., ensemble machine learning (ML) model, can apply one or more transform functions or transformations 230 which process and transform the data 205 for use as input to one or more base machine learning (ML) models 240. Transformations 230 typically include many derived fields, where a derived field is a new field that is calculated from one or more original files or derived/calculated values or fields through a function. FIG. 4 illustrates a diagrammatic diagram showing the relationship between input data 205, shown as input data records 206, 207, and 208, Derived Fields 405, and base machine learning models 240. Derived Field 1 406 for example is defined or calculated by a function. The different Derived Fields 406, 407 and 408 are used in different base machine learning ML models 240, e.g., models 242, 244.

Computation and processing of transformations are usually slow because they usually include many derived fields. As a result, the machine learning (ML) model usually takes a long time to arrive at a prediction 290, or score 292, and can fail to provide real-time scoring and predictions. It would be advantageous to optimize the data analytics pipeline (e.g., the ensemble machine learning (ML) model) to provide a faster prediction and score.

In one or more embodiments the data analytics pipeline and/or ensemble machine learning (ML) model is optimized, for example by Optimizer ML Module 175, to improve their run time. In one or more approaches the interaction and influence between the base machine learning (ML) models and Derived Fields (DFs) are taken into account. In one or more arrangements, the Derived Field Importance Weight for the Derived Fields (DFIW4F) are computed and used for priority calculation. In one more aspects, the features that impact performance in the run time of Derived Fields are taken into consideration. In additional one or more arrangements, the Derived Field Importance Weight for Model (DFIW4M) are computed and used in the priority calculation. In one or more embodiments, the derived fields are prioritized and parallel processed based upon cluster analysis of DFIW4M and DFIW4F. In a further optional enhancement, the computation of transformations by Derived Field are reduced by a similarity analysis.

Figure 5:
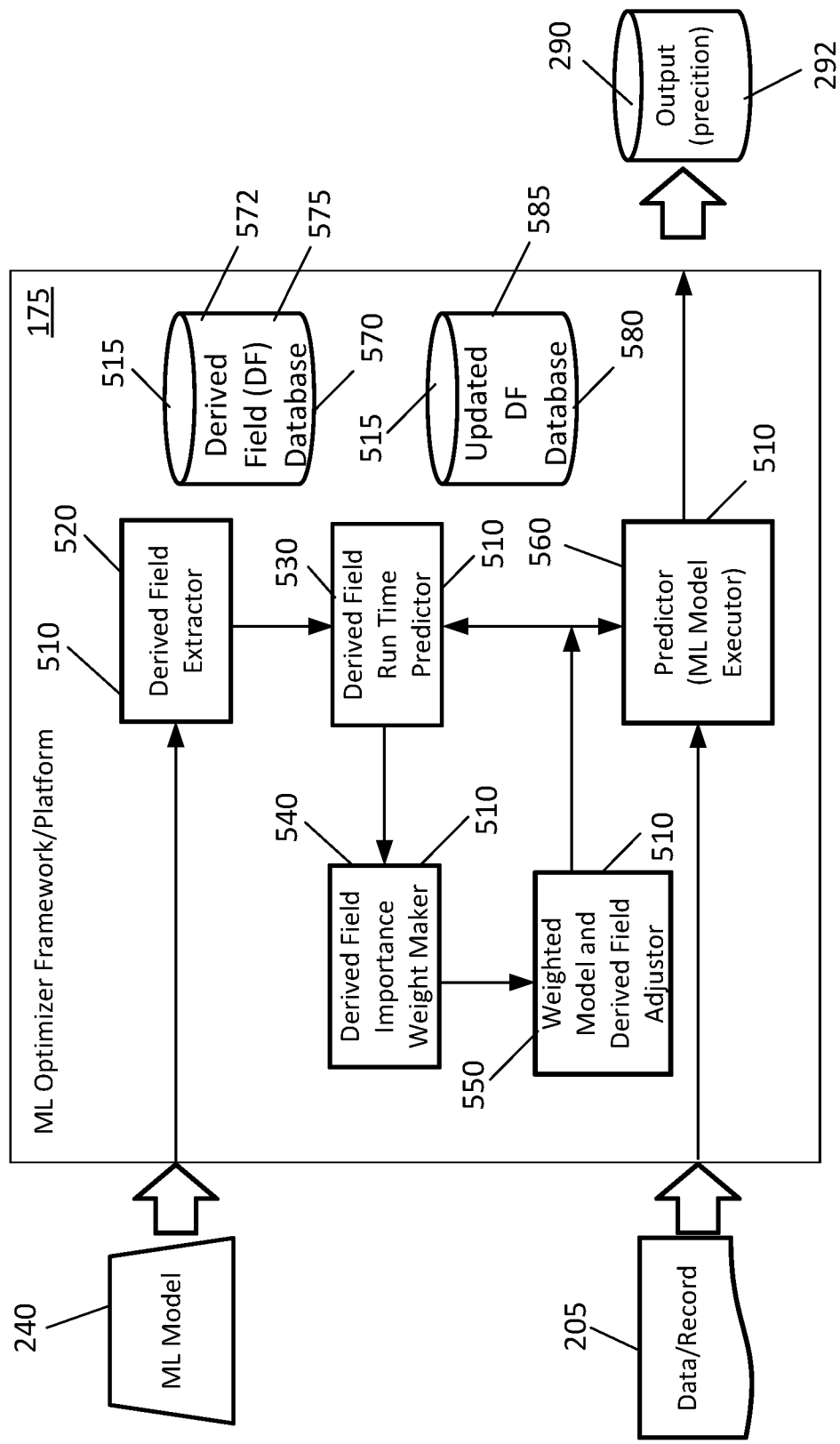
FIG. 5 illustrates an overview block diagram of a system/module to run electronic data analytics programs to generate predictions in accordance with an embodiment of the disclosure and in an aspect to generate and run machine learning (ML) models in a more efficient and faster manner.

FIG. 5 shows a block diagram of ML Optimizer Module 175. For purposes of clarity FIG. 5 discloses functional units 510 for the ML Optimizer Platform 175 while eliminating some of the details, specifics, and features of the ML Optimizer Framework 175 and the System 100 of FIG. 1. The functional units 510, and/or processing units associated with the functional units 510, contain instructions and/or logic for operating circuitry to perform the respective functions and operations of the functional units 510 as will be described herein. For example, the functional units 510 contain instructions and/or logic executable by circuitry, for example in a processor, computer, server, etc., to perform one or more of the processing steps performed by the functional unit 510.

ML Optimizer Module 175 in the embodiment of FIG. 5 discloses functional units 510 including Derived Field (DF) Extractor 520, Derived Field Run Time Predictor 530, Derived Field (DF) Importance Weight Maker 540, Weighted Model and Derived Field Adjustor 550, and Predictor (e.g., ML Model Executor) 560. ML Optimizer Framework 175 can further include one or more databases (DBs) 515, including for example, Derived Field (DF) Database 570 and Updated Derived Field (DF) Database 580. Derived Field Database 570 can store or contain data records 205, Derived Fields (DFs) 405, Derived Field Table 575, and/or Derived Field Records 572 while Updated Derived Field (DF) Database 580 can store Update the Derived Field (DF) Table 585 to name a few of the records, data and/or tables contained and/or stored in databases 570 and 580. ML Optimizer Module 175 can include one or more functional units 510 or databases 515, and the functional units and databases can be arranged as shown or in different configurations and arrangements, with more or less functions and features. The functional units 510 and databases 515 of the ML Optimizer Framework 175 will be explained in more detail in conjunction with the process and method 600 of the flow chart of FIG. 6.

The Derived Field Extractor 520 in an embodiment contains instructions and logic for operating circuitry to parse and extract information from Derived Fields (e.g., Derived Fields 405). The operations of the Derived Field Extractor 520 will be described in more detail below. The Derived Field Runtime Predictor 530 in an embodiment contains instructions and logic for operating circuitry to predict the runtimes of the Derived Fields (e.g., Derived Fields 405). The operations of the Derived Field Runtime Predictor 530 will be described in more detail below. The Derived Field Importance Weight Maker 540 in an embodiment contains instructions and logic for operating circuitry to calculate the Derived Field Importance Weight for the Derived Fields (DFIW4F) and the Derived Field Importance Weight for the Model (DFIW4M). The operations of the Derived Field Importance Weight Maker 540 will be described in more detail below. The Weighted Model and Derived Field Adjustor 550 in an embodiment contains instructions and logic for operating circuitry adjust and prioritize the Derived Field calculations for the base machine learning (ML) models and for the ensemble machine learning (ML) model. The operations of the Weighted Model and Derived Field Adjustor 550 will be described in more detail below.

The ML Module 170 typically through input from an analyst or other user, or optionally as part of a program, selects programs or models (e.g., machine learning models) to run in order to generate predictions 290. The ML Module 170 can be run to generate predictions, such as, for example at predetermined times, immediately or any desired time, and/or automatically or manually by a user.

ML Optimizer Module 175 and Predictor 560 in an embodiment can run in conjunction with ML Model Module 170. For example, one or more machine learning models 240, e.g., one or more base machine learning models 240, from the ML Model Module 170 can be invoked or used as input into the ML Optimizer Module 175. In one or more approaches the base machine learning (ML) models and transformations are optimized by the ML Optimizer Module 175 to optimize the data analytics pipeline and/or ensemble machine learning (ML) model executed by the Predictor 560. Predictor 560 executes the improved data analytics pipelines, including creating the pipeline configuration, and executing the tasks/steps in the pipeline. Predictor 560 runs the data analytics pipeline task-by-task, including the transformations 230 and one or more base machine learning (ML) models 240 to generate and output score 292 and/or prediction 290. Optimization of the base machine learning models and transformations are shown in connection with method 600 illustrated in the flow chart of FIG. 6. As illustrated in FIG. 5, the ML Optimizer Framework 175 receives the ML Model 240 and data 205 (e.g., records 205) and in an embodiment optimizes the ML model, and executes the optimized ML Model using the Predictor 560 to output a performance score 292 or prediction 290. It can be appreciated that Predictor 560 shown as part of the Optimizer Framework 175 can be part of ML Module 170 or be a separate module in 162 in memory 160.

Figure 6:
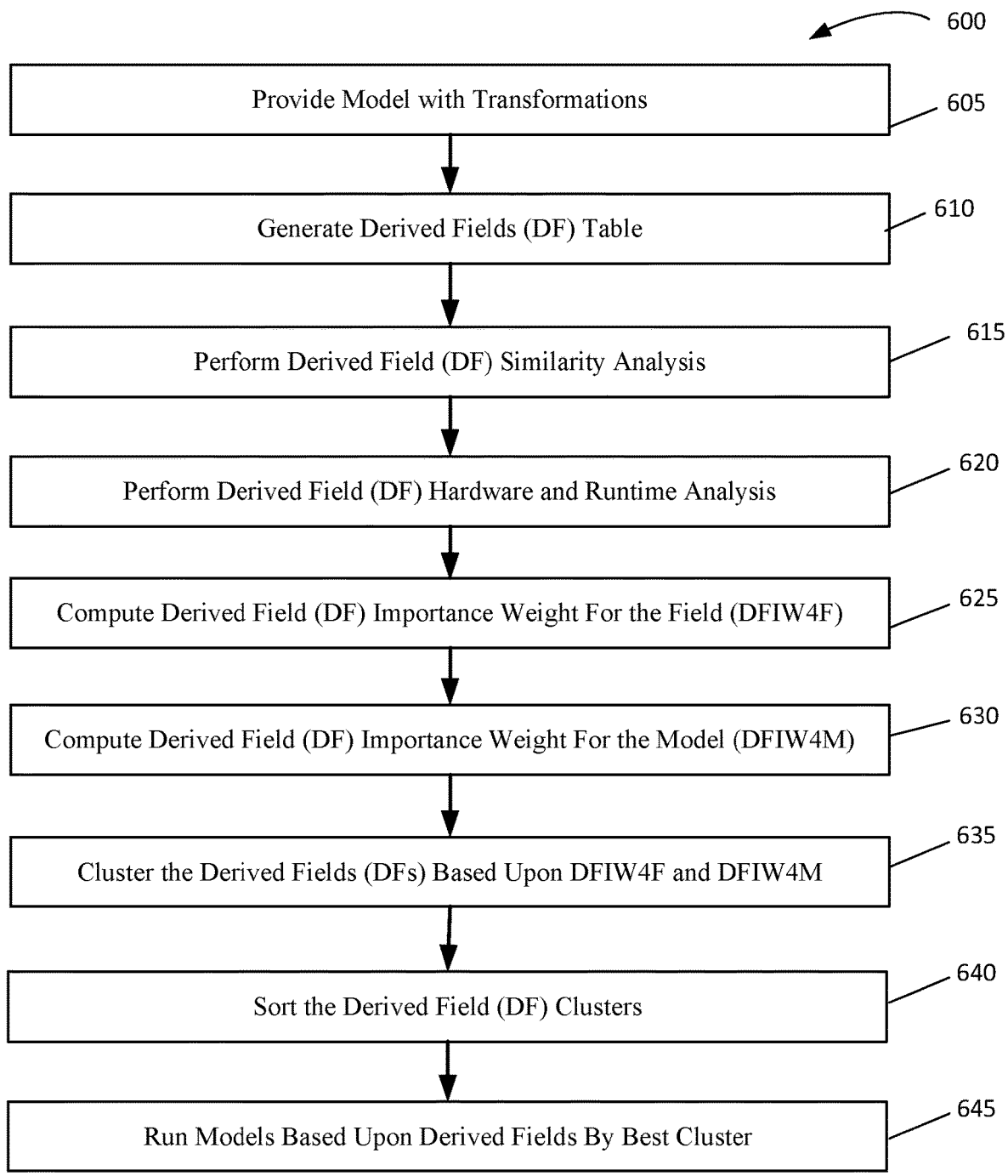
FIG. 6 illustrates a diagrammatic flowchart of a method of providing improved data transformation prediction method for ensemble machine learning (ML) models according to an embodiment of the disclosure.

FIG. 6 is an exemplary flowchart in accordance with an embodiment illustrating and describing a method 600 of optimizing a data analytics pipeline and/or ensemble machine learning (ML) model by optimizing the transformations utilized in the data analytics pipeline and/or ensemble machine learning (ML) model to obtain higher performance including a faster prediction and score in a data analytic pipeline and/or ensemble ML model, including an efficient transformation prediction technique. While the method 600 is described for the sake of convenience and not with an intent of limiting the disclosure as comprising a series and/or a number of steps, it is to be understood that the process 600 does not need to be performed as a series of steps and/or the steps do not need to be performed in the order shown and described with respect to FIG. 6, but the process 600 may be integrated and/or one or more steps may be performed together, simultaneously, or the steps may be performed in the order disclosed or in an alternate order.

Figures 9, 11:
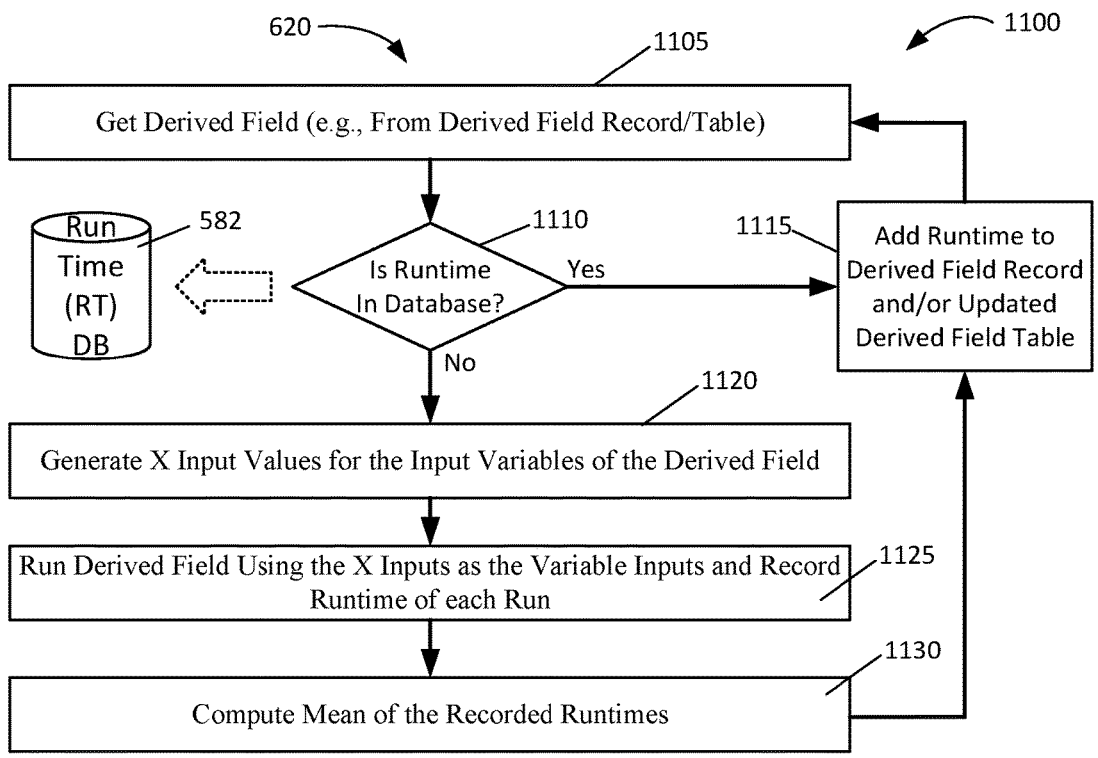
FIG. 9 illustrates a representative example of a Derived Field Table according to an embodiment of the disclosure.
FIG. 11 illustrates a diagrammatic flow chart of a method of performing a Derived Field hardware and run time analysis.

As part of process 600, at 605 a machine learning (ML) model (e.g., a base ML model 240) is provided or received. In an embodiment, the machine learning model is provided with its transformations. In an approach, the machine learning model is provided at 605 to a Derived Field (DF) Extractor 520. Further details and embodiments regarding providing the machine learning model will be described in connection with FIG. 7, and the flow chart of method 700. At 610, in an embodiment, a Derived Field (DF) Table 575 is generated. In an approach the Derived Field Table, e.g., Derived Field (DF) Table 575 of FIG. 9, is generated by the DF Extractor, e.g., DF Extractor 520. Further details and embodiments regarding generating the DF Table at 610 will be described in connection with FIG. 7, and the flow chart of method 700.

The Process 600 continues at 615 where a Derived Field (DF) similarity analysis is performed. Further details and embodiments regarding the DF similarity analysis will be described in connection with FIG. 10 and the flow chart of method 1000. The process 600 continues to 620 where a Runtime analysis is performed. Further details and embodiments regarding performing the Derived Field (DF) Runtime analysis at 620 and storing the runtime analysis will be described in connection with FIG. 11 and the flow chart of method 1100, and the Updated Derived Field (DF) Table 585 of FIG. 12. At 625 the Derived Field Importance Weight for the Field (DFIW4F) is computed. Further details and embodiments regarding performing the Derived Field (DF) Importance Weight for the Field at 625 will be described in greater detail below. At 630, the Derived Field Importance Weight for the Model (DFIW4F) is computed. Further details and embodiments regarding performing the Derived Field (DF) Importance Weight for the Model at 630 will be described in connection with FIGS. 14 & 15, and the flow charts of methods 1400 & 1500, as well as the diagrams and tables of FIGS. 13, 16 & 17.

Figures 19, 20, 21:
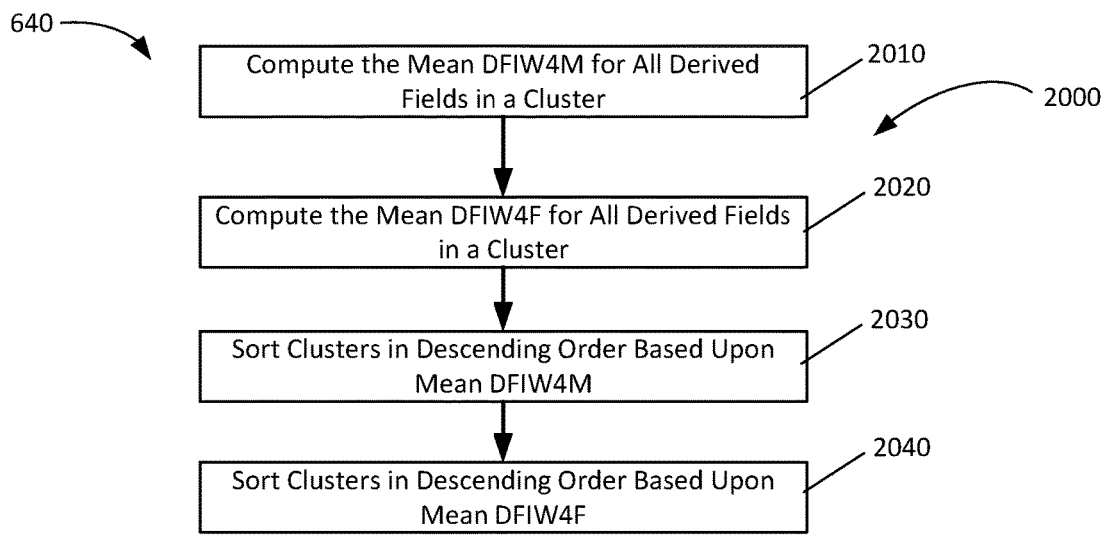
FIG. 19 depicts a representative example Cluster Table showing the relationship between the clusters and the Derived Fields according to an embodiment of the disclosure.
FIG. 20 illustrates a diagrammatic flowchart of a method of sorting the Derived Field Clusters according to an embodiment of the disclosure.
FIG. 21 illustrates a representative example Cluster Chart showing the mean DFIW4M and DFIW4F for each cluster according to an embodiment of the disclosure.

The Derived Fields (DFs) at 635 are clustered based upon Derived Field (DF) Importance Weigh for the Derived Field (DFIW4F) and the Derived Field (DF) Importance Weight for the Model (DFIW4M). FIG. 18 shows an example of how the Derived Fields are clustered based upon DFIW4F and DRIW4M and the Table of FIG. 19 shows the results of the clustering. The Clusters based upon DFIW4F and DFIW4M are sorted at 640. At 645, the machine learning (ML) models based upon Derived Fields are run by best cluster. That is the Derived Fields in the best cluster are run first at 645.

Figure 7:
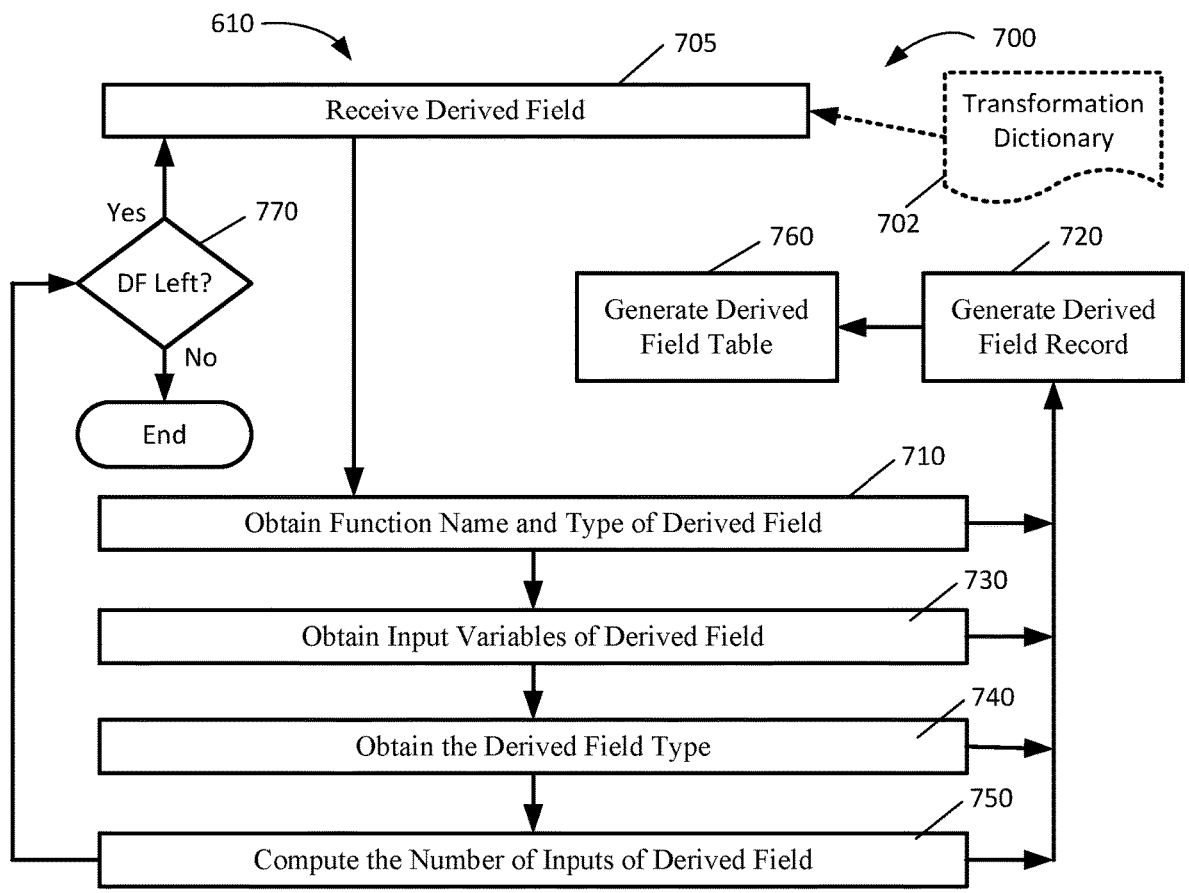
FIG. 7 illustrates a diagrammatic flowchart of a method of generating a Derived Field Table by parsing and/or extracting information from Derived Fields according to an embodiment of the disclosure.

FIG. 7 is an exemplary flowchart in accordance with an embodiment illustrating and describing a method 700 of generating a Derived Field (DF) Table, including in an embodiment parsing a Derived Field (DF) using a Derived Field (DF) extractor. While the method 700 is described for the sake of convenience and not with an intent of limiting the disclosure as comprising a series and/or a number of steps, it is to be understood that the process 700 does not need to be performed as a series of steps and/or the steps do not need to be performed in the order shown and described with respect to FIG. 7, but the process 700 may be integrated and/or one or more steps may be performed together, simultaneously, or the steps may be performed in the order disclosed or in an alternate order.

At 705, a machine learning (ML) model, e.g., a base machine learning model, with transformations is provided for example to the ML Optimizer Module 175, and in an approach is provided to a DF Extractor 520. The machine learning (ML) model according to an approach includes transformations and a transformation dictionary 702. The Transformation dictionary 702 includes one or more, and likely, numerous Derived Fields (e.g., Derived Fields 405). At 705 a Derived Field (DF) is provided, extracted, and/or received and the DF Extractor 520 in an approach parses the Transform Dictionary 702 to obtain the Derived Fields (DFs) 405.

Figure 8:
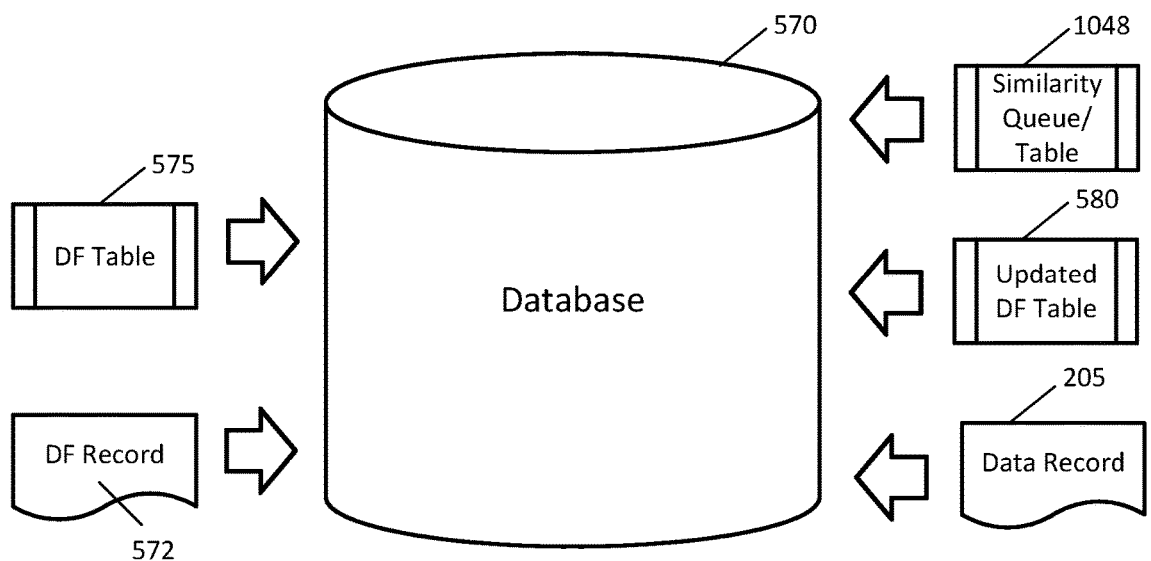
FIG. 8 diagrammatically illustrates a block diagram of an example representative Database according to an embodiment of the disclosure.

At 710 the Function name and type of Derived Field (DF) is obtained and stored at 720 as part of generating a Derived Field (DF) Record 572 (See FIG. 8), which in an example resides, is located, or storied in Derived Field (DF) Database 570. The Derived Field Record 572 in an embodiment describes the Derived Fields feature. In an approach, the function name and type of the Derived Field 405 is parsed at 710 by the DF extractor 520. At 730, the input variables of the Derived Field (DF) are obtained and stored at 720 in Derived Field (DF) Record 572, which in an example resides in Derived Field (DF) Database 570. In an approach, the input variables of the Derived Field are parsed at 730 by the DF extractor 520. At 740, the type of the Derived Field (DF) is obtained and stored at 720 in Derived Field (DF) Record 572, which in an example resides in Derived Field (DF) Database 570 (shown in FIG. 8). In an approach, the Derived Field (DF) type is parsed at 740 by the DF extractor 520. At 750, the number of inputs (NOIs) of the Derived Field (DF) are obtained and stored at 720 in Derived Field (DF) Record 572, which in an example resides in Derived Field (DF) Database 570. In an approach, the number of inputs (NOI) are computed at 750, in an example by the DF extractor 520.

After 750, and after or in response to a Derived Field Record 572 being generated, an entry 976 can be generated at 760 in the Derived Field (DF) Table 575 (See FIG. 9). That is, at 760 an entry 976 can be entered, created, and/or generated in the Derived Field (DF) Table 575. After 750 it is also determined at 770 whether there are any derived fields that have not been parsed and for which a Derived Field Record 572 has not been generated. If a Derived Field Record 572 and/or an entry 976 for a Derived Field (DF) has not been created in the Derived Field (DF) Table 575 (e.g., Derived Field Table 575 in FIG. 9) for a Derived Field, i.e., there are Derived Fields (DFs) left that have not been parsed (770: Yes), then process 700 continues to 705 where a new Derived Field is obtained and process 700 continues through steps 710, 720, 730, 740, 750, and 760 to create a new Derived Field Record 572 for the Derived Field and record another entry 976 in Derived Field Table 575. This loop continues until all the Derived Fields 405 have been analyzed, parsed, computed and a Derived Field Record 572 has been created and information has been stored as entries 976 in the Derived Field Table 975 for all Derived Fields 405 in the base ML model. That is, the process 700 and loop continues until all Derived Fields 405 have been parsed and there are no Derived Fields left (770: No) and then process 700 ends and the Derived Field Table 575 has been created. It can be appreciated that process 700 continues for all base ML models in the ensemble ML model so that all Derived Fields 405 in the ensemble ML model have been parsed.

An example Derived Field (DF) Table 575 is shown in FIG. 9, where information for each Derived Fields (DF) 405 has been parsed and recorded as an entry 976 in the DF Table 575. In the example DF table 575, each Derived Field entry 976 has numerous columns, where "To" is the target Derived Field name; "Target Type" is the derived field type, such as string, real, integer; "NOI" is the number of inputs, e.g., the total input variables; "Inputs" are the input variables for the Derived Field; "Func_name" is the function name of the derived field; and "Func_depth" are the number of recursions/levels of the function.

Figure 10:
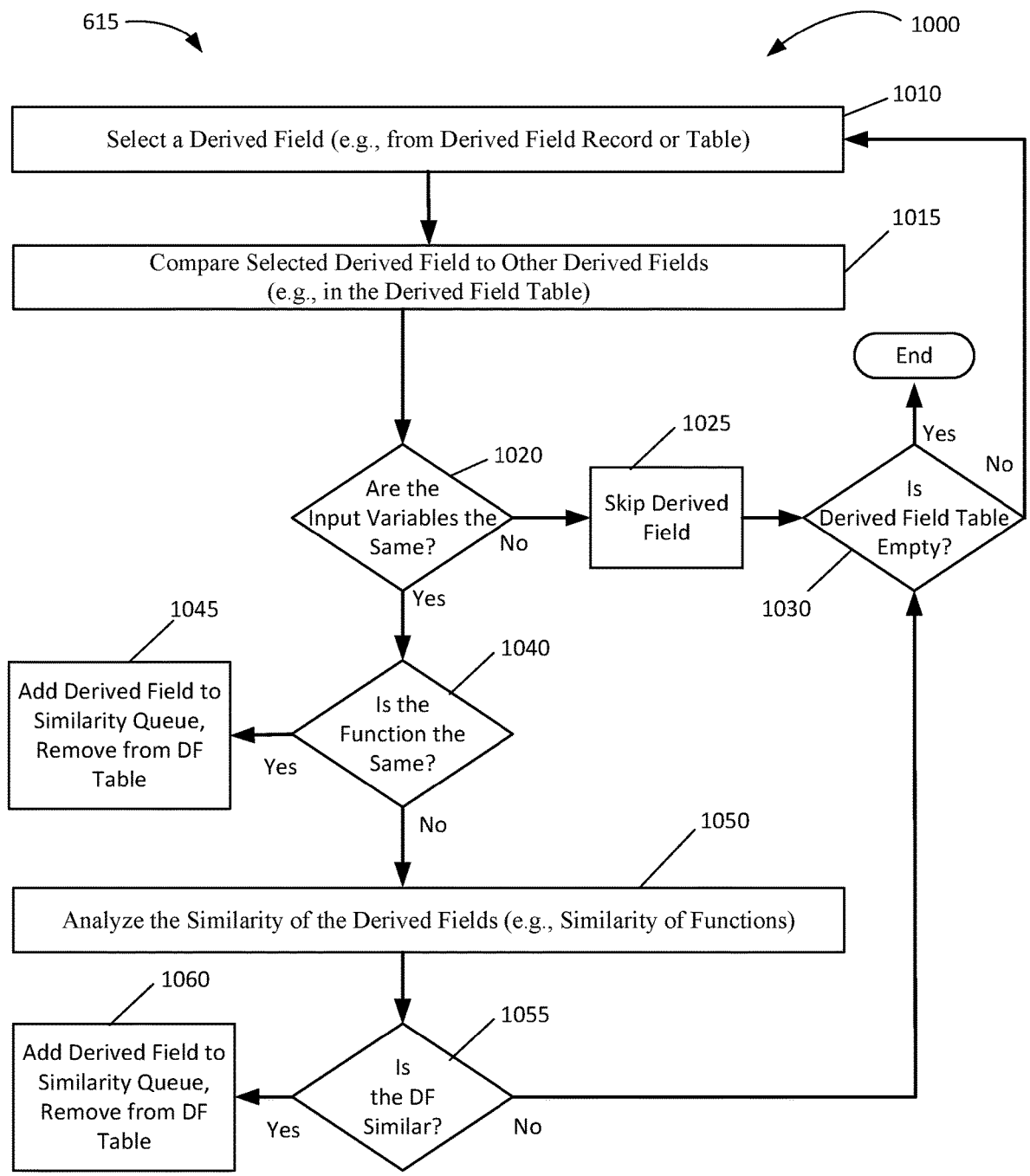
FIG. 10 illustrates a diagrammatic flow chart of a method of performing a Derived Field similarity analysis according to an embodiment of the disclosure.

FIG. 10 is an exemplary flowchart in accordance with an embodiment illustrating and describing a method 1000 of performing an optional similarity analysis for the Derived Fields (e.g., Derived Fields 405), and in an embodiment performing the process step 615 of FIG. 6. While the method 1000 is described for the sake of convenience and not with an intent of limiting the disclosure as comprising a series and/or a number of steps, it is to be understood that the process 1000 does not need to be performed as a series of steps and/or the steps do not need to be performed in the order shown and described with respect to FIG. 10, but the process 1000 may be integrated and/or one or more steps may be performed together, simultaneously, or the steps may be performed in the order disclosed or in an alternate order.

At 1010 a Derived Field is selected. The Derived Field can be selected from a Derived Field (DF) Record 572, from the Derived Field Table 575, and/or from the Updated Derived Field Table 585. Other means and locations from where to select and/or obtain a Derived Field are contemplated. At 1015 the selected Derived Field is compared to other Derived Fields, for example other Derived Fields in the Derived Field Table 575 and/or the updated Derived Field Table 585. At 1020 it is determined whether the input variables for the selected Derived Field are the same as the input variables of any other Derived Field. If at 1020 it is determined that the input variables for the selected Derived Field are not the same as the input variables of any other Derived Fields (1020: No), then process 1000 continues to 1025 where the selected Derived Field is skipped. After 1025, process 1000 continues to 1030 where it is determined if there are any Derived Fields that have not been checked (e.g., determined whether every Derived Field in the Derived Field Table 575 (or the Updated Derived Field Table 585) has been checked (e.g., undergone a similarity analysis)). If every Derived Field has been checked, e.g., undergone a similarity analysis (1030: Yes), then process 1000 (the similarity analysis) ends. If every Derived Field has not been checked, e.g., undergone a similarity analysis (1030: No), then process 1000 continues to 1010 where a new Derived Field is selected, to 1015 with the new selected Derived Field and compares it to other Derived Fields, and to 1020 where it is determined whether the input variables for the selected Derived Field are the same as the input variables of any other Derived Fields.

If at 1020 it is determined that the input variables for the selected Derived Field are the same as the input variables of another Derived Field (1020: Yes), then process 1000 continues to 1040 where it is determined whether the function of the selected Derived Field is the same as the function of the Derived Field that has the same input variables (e.g., the comparison Derived Fields). If at 1040 it is determined that the selected Derived Field has the same function as the comparison Derived Field, e.g., the Derived Field that has the same input variables as the selected Derived Field, (1040: Yes), then process 1040 continues to 1045 where the selected Derived Field is added to a Similarity Queue 1048 (See FIG. 8) in the Derived Field Database 570, and removed from the Derived Field Table 575. It can be appreciated that other means and locations of saving the selected Derived Field or information on the selected Derived Field that has the same function as the comparison Derived Field are contemplated.

As part of the optional similarity analysis (e.g., process 615 and/or 1000), process 1000 can optionally continue, if the function of the selected Derived Field is not the same function as the comparison Derived Field (1040: No), to 1050 where a similarity analysis between the selected Derived Field to the comparison Derived Field is performed. More specifically, in an approach, it can be determined at 1055 whether the similarity of the function of the selected Derived Field and the comparison Derived Field are similar. If the similarity of the function of the selected Derived Field is similar to the function of the comparison Derived Field (1055: Yes), then in an embodiment, at 1060 the selected Derived Field is entered or saved to the Similarity Queue 1048 and removed from the Derived Field Table 575 and/or the Updated Derived Field Table 585. If the function of the selected Derived Field and the comparison Derived Field are not the determined at 1055 to be similar (1055: No) then process 1000 proceeds to 1030 where it is determined whether there are any Derived Fields that have not undergone a similarity analysis (e.g., whether the Derived Field Table 575 and/or Updated DF Table 585 is empty or has any Derived Fields left that have not been checked). In another embodiment it can be determined whether any Derived Field Records 572 have not been checked.

The similarity analysis at 1055 can be performed according to one or more approaches. For example, it can be determined whether the field of the field reference is the same, or whether other attributes of the selected Derived Field and the comparison Derived Field are the same. Other comparisons and/or attributes can be used as criteria for the similarity analysis, which will be a matter of design choice. In addition, or alternatively, where it is determined that the DF are similar (1055: Yes), the Derived Fields can be merged.

FIG. 11 is an exemplary flowchart in accordance with an embodiment illustrating and describing a method 1100 of performing a Runtime analysis for the Derived Fields, and in an embodiment performing the process step 620 of FIG. 6. While the method 1100 is described for the sake of convenience and not with an intent of limiting the disclosure as comprising a series and/or a number of steps, it is to be understood that the process 1100 does not need to be performed as a series of steps and/or the steps do not need to be performed in the order shown and described with respect to FIG. 11, but the process 1100 may be integrated and/or one or more steps may be performed together, simultaneously, or the steps may be performed in the order disclosed or in an alternate order.

At 1105 in process 1100 a Derived Field (DF) is obtained, for example from the Derived Field Table 575 and/or Derived Field (DF) Record 572. The Derived Field 405 can be obtained from anyone of a number of records, tables, and/or databases, and will in part depend upon the configuration of the system 100. In this regard, depending upon the configuration of the system 100 and for example whether a same or similarity analysis is performed at 615 in process 600 and/or process 1000, every Derived Field 405 can undergo process 1100 or a subset of the Derived Fields 405 (e.g., every Derived Field except the same and/or similar Derived Fields removed to the Similarity Queue 1048 and/or merged with another Derived Field (e.g., with Derived Field Record 572, in Derived Field Table 575, and/or updated DF Table 585)) can undergo process 1100.

At 1110 it is determined whether the Runtime for the selected Derived Field (DF) 405 is in the Database (e.g., Database 570, Database 580, Database 582). For example, Derived Field (DF) Table 575 in Derived Field Database 570 can be checked (e.g., searched) for the runtime for the Derived Field 405, the updated DF Table 585 can be checked (e.g., searched) in the Updated DF Database 580 for the runtime for the Derived Field 405, and/or a separate Run-Time Database (DB) 582 can be checked (e.g., searched) for the runtime for the Derived Field 405. It can be appreciated that Derived Field Table 575 and Updated Derived Field (DF) Table 585 can be the same Table where the Updated DF Table 585 is the Derived Field (DF) Table 575 updated with information including for example the Runtime for the Derived Fields 405. An example of the Updated DF Table 585 is shown in FIG. 12, where the Updated DF Table 585 is organized by Derived Field entries 1276. Additionally, or alternatively, a Runtime Database 582 can be checked (e.g., searched) for the Runtime for the Derived Field (DF).

If the runtime is in the Runtime Database 582 or in any other Table or Database (1110: Yes), then at 1115 the runtime can be added to the Derived Field Record 572 and/or is added to an entry 1276 in the Updated Derived Field (DF) Table 585 (and/or to an entry 976 in the Derived Field (DF) Table 575). It can be appreciated that Runtime Database (DB) 582 can be the same database as Derived Field (DF) Database 570 (and/or as Updated Derived Field (DF) Database (DB) 585). For example, the runtime can be obtained from Runtime Database (DB) 582, from Derived Field Record 572, from Derived Field Table 575, from Derived Field database (DB) 570, from updated Derived Field (DF) Database (DB) 580 and/or Updated Derived Field Table 585. Other methods and locations of storing the runtime for the derived fields are contemplated. After and/or in response to the runtime being added to the Derived Field (DF) Record 572, the Derived Field Table 575, the Updated Derived Field (DF) Table 585, and/or other memory storage location in system 100 (preferably Memory 160), the process 1100 continues back to 1105 where another (e.g., the next Derived Field) is obtained and process 1100 continues to 1110.

If the Runtime for the Derived Field is not in a database, a table, or otherwise available (1110: No), then process 1100 continues to 1120 to generate a runtime for the Derived Field. More specifically, as part of the process to create a runtime for the Derived Field, at 1120 "X" input values for the Input Variables of the Derived Field are generated, where X can be any number of values and in an example is less than 5 input values for the input variables of the Derived Field, preferably 3 values for the input variables for the Derived Field. The number X of input values is generally a user setting but can be preconfigured, preset, predetermined, fixed, adjustable, programmable and/or machine learned. The input values generated at 1120 preferably are based on the input variables for the derived field. At 1125 the runtime is predicted based upon using each of the "X" input values. More specifically, according to an approach, the Derived Fields are run/executed using each of the "X" input values for the variable inputs for the Derived Field and the runtime is recorded, for example in the Runtime (TT) database 582. That is, at 1125 a prediction of the runtime is made by executing the Derived Field using each of the "X" input values for the input variables of the Derived Field. For example, if "X" is three input values then three different runtimes are calculated/predicted for each different set of values.

At 1130 a mean is calculated for the "X" predictions/calculations that are made for the derived field using the "X" input value sets, and the runtime (mean and/or each run) is recorded to a database, record, and/or table. In an example, the details of the runs and runtime are recorded to a database, record, and/or table. For example, the mean runtime can be added to the Derived Field Record 572, an entry 976 in the Derived Field Table 175, and/or an entry 1276 in the Updated Derived Field Table 585. An example of the updated Derived Field Table 585 is shown in FIG. 12 where the runtime for each Derived Field 405 has been added and/or updated.

After the runtime information has been updated in the Runtime Database 582, the Derived Field Table 575 and/or the Derived Field Table 585 (or in any other location or storage area), process 1100 continues back to 1105 where another Derived Field is obtained and process 1100 continues through steps 1110-1130 for the new Derived Field. This loop shown in FIG. 11 continues until the Derived Fields have runtime predictions added and/or stored to a database, record, and/or table, preferably in system 100 (e.g., Memory 160). It can be appreciated that where Derived Fields have been removed and/or merged because of the same function and/or similarity analysis 1000 less runtime predictions and/or computations will be performed during process 1100.

At 625 in process 600, the Derived Field Importance Weight (DMIW) for the Field (DMIW4F) is computed. It should be pointed out the DMIW4F is based upon the runtime contribution of computing each Derived Field (e.g., the amount of time to reach or compute a result for each Derived Field 405). The DMIW4F is computed for each Derived Field 405. In an example, the DMIW4F for Derived Field No. 1 (Derived Field_1) is:

$$DFIW4F_1 =$$
$$DFRT_{1\_1}/\left(\sum\nolimits_{d=1}^{K}(DFRT_d)\right)/K + DFRT_{1\_2}/\left(\sum\nolimits_{d=1}^{M}(DFRT_d)\right)/M + \ldots +$$
$$DFRT_{1\_y}/\left(\sum\nolimits_{d=1}^{N}(DFRT_d)\right)/N$$

where DFRT refers to the runtime of the Derived Field to reach a result and $DFRT_{11}$ is the runtime for Derived Field 1 in the base machine learning (ML) model 1 in the ensemble machine learning (ML) Model. The first subscript N in $DFRT_{N\_y}$ is the index of the Derived Field (which in the example above, N is Derived Field 1) and the second subscript Y is the last index of the base machine learning (ML) model in the ensemble machine learning (ML) model. The DMIW4F is computed for each Derived Field where there are N Derived Fields, and in an embodiment the formula for the Derived Field Importance Weight DMIW4F for each of N Derived Fields is:

$$DFIW4F_1 =$$
$$DFRT_{1\_1}/\left(\sum\nolimits_{d=1}^{K}(DFRT_d)\right)/K + DFRT_{1\_2}/\left(\sum\nolimits_{d=1}^{M}(DFRT_d)\right)/M + \ldots +$$
$$DFRT_{1\_y}/\left(\sum\nolimits_{d=1}^{N}(DFRT_d)\right)/N$$

*

*

*

$$DFIW4F_N =$$
$$DFRT_{N\_1}/\left(\sum\nolimits_{d=1}^{K}(DFRT_d)\right)/K + DFRT_{N\_2}/\left(\sum\nolimits_{d=1}^{M}(DFRT_d)\right)/M + \ldots +$$
$$DFRT_{N\_y}/\left(\sum\nolimits_{d=1}^{N}(DFRT_d)\right)/N$$

It can be appreciated that depending upon the system configuration, for example, if the same or similarity analysis is performed, there can be less DFIW4F calculations, as the DFIW4F does not need to be computed for every Derived Field 405.

FIG. 13 shows a table 1308 that that shows the relationship between Derived Fields 405 and a machine learning (ML) model (e.g., a base machine learning (ML) model). The Column labeled "Model" identifies the various base ML models and for each base ML model the columns labeled "Input DF 1", Input DF 2", . . . "." identify the various Derived Fields that would need calculation for that base model. The column labeled "Total RT" is the Runtime calculation for that base ML model. For example, Base Model M1 includes: as input; Derived Field 1, Derived Field 3, and Derived Field 5; and a Runtime of 8. The information in and/or table 1308 of FIG. 13 can be stored in system 100, Memory 160, and or one or more of the Databases 415.

The calculation of the DFIW4F for each Derived Field 405 includes in an embodiment simultaneous analysis of the model and transformations. That is, an ensemble machine learning model or data analytics pipeline 200, as shown in FIG. 2, often includes multiple base machine learning (ML) models 240. In connection with calculating the DFIW4F for each Derived Field, the computations of the runtime to arrive at a result can in one or more approaches include simultaneous analysis and computation of multiple derived fields, which can result in faster analysis and improved performance.

Figure 14:
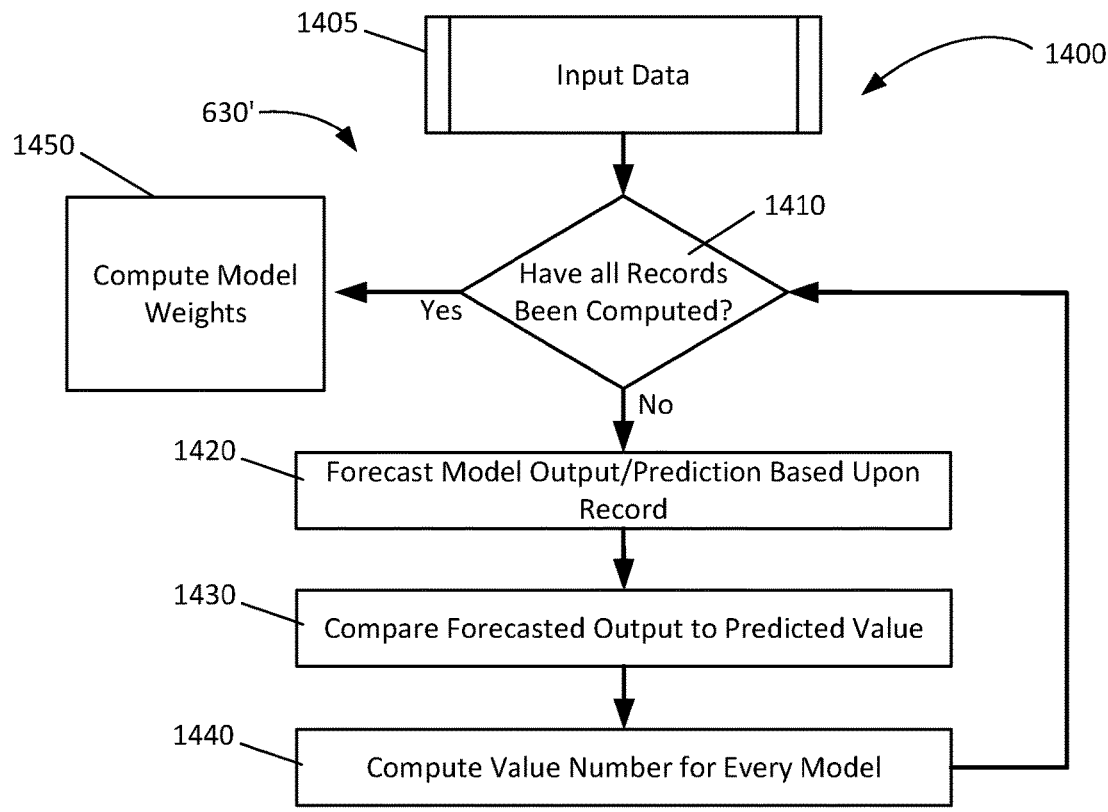
FIG. 14 illustrates a diagrammatic flowchart of a method of calculating the contribution of each base machine learning (ML) model in the ensemble machine learning (ML) model according to an embodiment of the disclosure.

At 630 in process 600, the Derived Field Importance Weight (DMIW) for the Model (DMIW4M) is computed. FIG. 14 is an exemplary flowchart in accordance with an embodiment illustrating and describing a method 1400 of calculating the contribution of each base machine learning (ML) model in the ensemble machine learning (ML) model. That is, process 1400 in an approach is directed to computing the base ML model weight. In an approach, the process 1400 of calculating the contribution of each base machine learning (ML) model in the ensemble machine learning (ML) model is a portion 630' of the process 630 of computing the DMIW4M. While the method 1400 is described for the sake of convenience and not with an intent of limiting the disclosure as comprising a series and/or a number of steps, it is to be understood that the process 1400 does not need to be performed as a series of steps and/or the steps do not need to be performed in the order shown and described with respect to FIG. 14, but the process 1400 may be integrated and/or one or more steps may be performed together, simultaneously, or the steps may be performed in the order disclosed or in an alternate order.

At 1405 in process 1400 the input data is prepared, and an input record is retrieved. At 1410 it is determined whether all the Input data and/or Input Records have been processed and/or used to calculate/compute a value number (e.g., a number representing a weight, contribution, or importance) for every base machine learning (ML) model. If all the input data and/or input records have not been processed and/or used to compute a value number for all the base machine learning (ML) models (1410: No), then process 1400 continues to 1420, 1430 and 1440 as described below. If all the input data and/or input records have been processed and/or used to compute a value number for the base machine learning (ML) models (1410: Yes), then process 1400 continues to 1450 where the model weights (e.g., the weights for each base ML model in the ensemble ML model) are calculated.

That is, at 1450, the base ML model weight is computed. In this regard, the contribution weight of a base model n is calculated using the formula:

$$A_n = (\Sigma_{m=1}^{W}(T_{1m}))/W$$

where $A_n$ is the contribution weight of base ML model n in arriving at a correct prediction, $T_{nm}$ is a measure of whether the prediction is correct or false and has a value of 1 or 0 (1 if the prediction is correct and 0 if the prediction is wrong), "n" is the identification of the base ML model at issue and "W" is the number of base ML models in the ensemble ML model. So, for example, at 1450, the contribution weight for base ML model 1 ($A_1$) is calculated using:

$$A_1 = (\Sigma_{m=1}^{W}(T^{1m}))/W$$

If the Input Data or Input Records is not empty, process 1400 continues to 1420 where the base ML model is run and/or executed using an input record and a forecast and/or prediction (e.g., prediction 290) is made and/or output for the current base model and the ensemble model using that input record. At 1430 the forecasted output by running the base ML model using the input record is compared to the final predicted value (e.g., the value) of the ensemble ML model (e.g., based upon the input record). At 1440 the value number for every base ML model is computed whereby in an embodiment, if the forecasted output of the base ML model running the input record is the same as the predicted value for the ensemble ML model, then the model is given a value number of 1, otherwise the model is given a value number of 0. For example, If the predicted value of the current base ML model is the same as the final predicted value for that base ML model after running all the records (the or the records processed) then ($T_{1m}$) in the formula $$A_1 = (\Sigma_{m=1}^{W}(T_{1m}))/W$$

is equal to 1, otherwise ($T_{1m}$) is equal to zero.

After 1440 and the contribution weight of a base ML model is computed (e.g., contribution weight of base ML model 1 ($A_1$)), process 1400 continues to 1410 where if there are additional records and not all the input records have been processed or computed, then another record is retrieved and process 1420-1440 is repeated. The results of the comparison (e.g., the compute value number for every base ML model at 1440) are accumulated for each base ML model for each record. On the other hand, if all the input records have been computed (1410: Yes), then process 1410 continues to 1450 to calculate the contribution or weight for each of the base ML models in the ensemble ML model. At the conclusion of process 1400 the contribution of each base ML model has been calculated where the contribution represents the contribution of each base ML model in arriving at a correct prediction in the ensemble ML model. In a further process, or optional step in process 1400, the top contributing base ML models could be output along with their weights and/or all the base ML models could be arranged and organized (for example, in a table) based upon the contribution and/or weight of each base ML model in the ensemble ML model.

Figure 15:
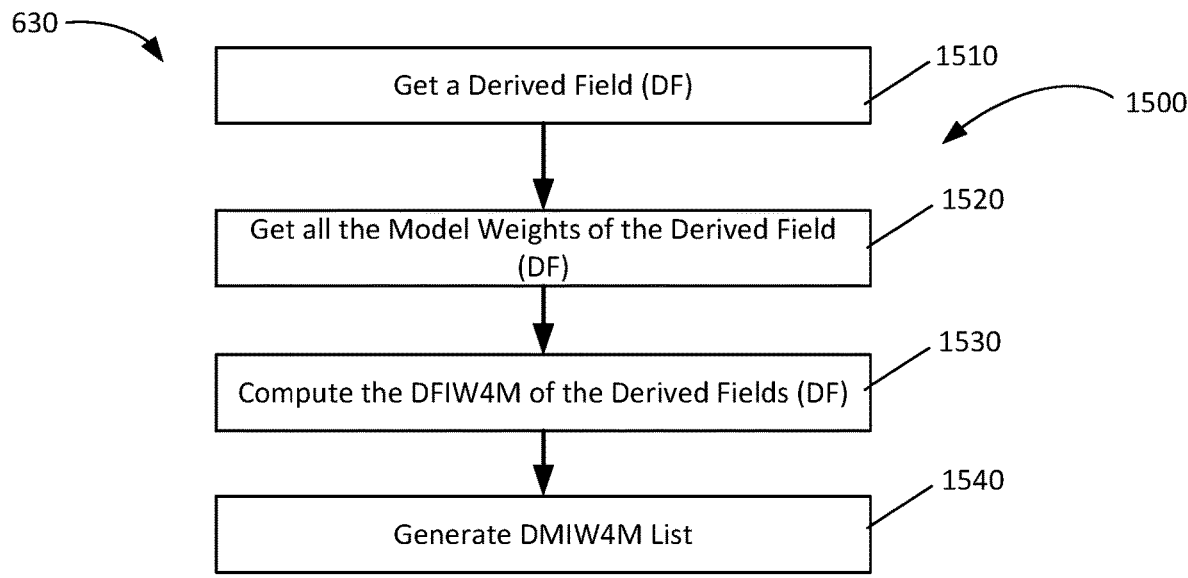
FIG. 15 illustrates a diagrammatic flowchart of a method of calculating the Derived Field Importance Weight for a base Machine learning (ML) model (DFIW4M) according to an embodiment of the disclosure.

FIG. 15 is an exemplary flowchart in accordance with an embodiment illustrating and describing a method 1500 of calculating the derived field weight based upon the model weight/contribution. That is, process 1500 in an approach is directed to computing the Derived Field Importance Weight for a Model (DMIW4M). The process 1500 of calculating the DFIW4M is an embodiment of the process 630. While the method 1500 is described for the sake of convenience and not with an intent of limiting the disclosure as comprising a series and/or a number of steps, it is to be understood that the process 1500 does not need to be performed as a series of steps and/or the steps do not need to be performed in the order shown and described with respect to FIG. 15, but the process 1500 may be integrated and/or one or more steps may be performed together, simultaneously, or the steps may be performed in the order disclosed or in an alternate order.

In process 1500, at 1510 a Derived Field 405 is obtained and at 1520 all model weights for the Derived Field are obtained. For example, the model contribution weights (e.g., the contribution weight of each base ML model) as computed in process 1400 are used. At 1530, the Derived Field Importance Weight for the Model (DFIW4M) of the Derived Fields are computed. The DFIW4M is calculated using the formula:

$$DFIW4M_w = (\Sigma_{m=1}^{P}(MW_{wm}))/P$$

where W is the number of the base ML model in the ensemble ML model where the ensemble ML model has P base (ML) models. FIG. 16 illustrates a block diagram representation identifying each of the base (ML) models used by Derived Field and identifies the base ML models and the model weights (MW) to use in the calculation of the DFIW4M. At 1540, a list of DFIW4M can be generated. In addition, a weight table 1700 of all the Derived Fields 405 can be created as shown in FIG. 17 and stored. As shown in FIG. 17 each column in weight table 1700 identifies one of the Derived Fields 405 and for each Derived Field 405 a DFIW4M and DFIW4F are provided.

Having calculated DFIW4F and DFIW4M, the Derived Fields 405 are clustered based upon the DFIW4F and DFIW4M, for example at 635. To facilitate clustering of the Derived Fields based upon DFIW4F and DFIW4M, a weight table 1700 of all the Derived Fields as shown in FIG. 17 can be created and stored. A block diagram 1800 showing the clustering of the Derived Fields 405 based upon DFIW4F and DFIW4M is shown in FIG. 18. To facilitate tracking which Derived Fields 405 belong to which cluster (e.g., cluster c1, cluster c2, cluster c3, etc.) every Derived Field 405 is provided with a cluster label and can be stored in a cluster Table, for example cluster Table 1900 shown in FIG. 19.

Process 600 continues at 640 based upon the cluster analysis. Process 640 in an approach can be performed by process 2000 shown in the flowchart of FIG. 20 where the Derived Field clusters are sorted and organized by their DFIW4M and the DFIW4F. While the method 2000 is described for the sake of convenience and not with an intent of limiting the disclosure as comprising a series and/or a number of steps, it is to be understood that the process 2000 does not need to be performed as a series of steps and/or the steps do not need to be performed in the order shown and described with respect to FIG. 20, but the process 2000 may be integrated and/or one or more steps may be performed together, simultaneously, or the steps may be performed in the order disclosed or in an alternate order.

Figure 22:
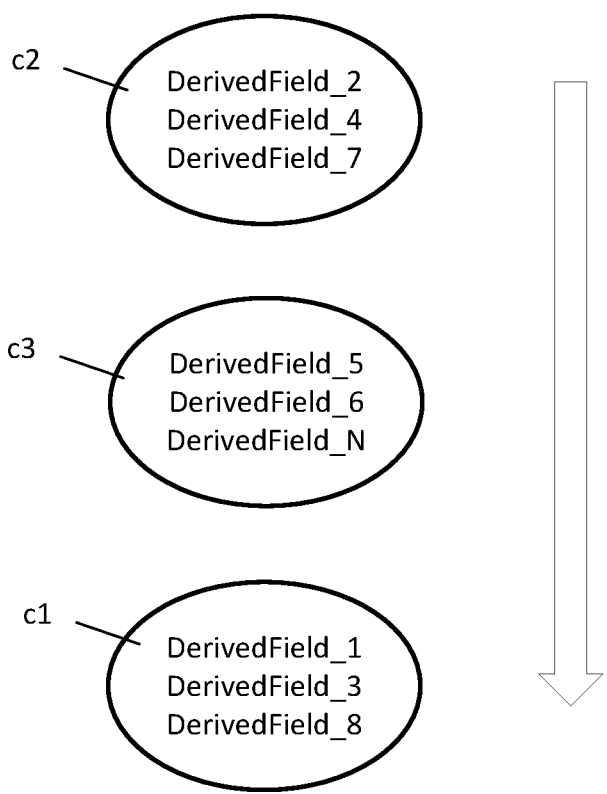
FIG. 22 is a diagrammatic block diagram illustrating the sorting of the Derived Field Clusters according to an embodiment of the disclosure.

At 2010 the mean of DFIW4M for all the Derived Fields 405 in every cluster are computed. For example, the M_DFIW4M for cluster c2, cluster c2 and cluster c3 are computed. The mean DRIW4M values for each cluster can be stored and/or organized in a chart, for example chart 2100 shown in FIG. 21. At 2020, the mean of DFIW4F for all Derived Fields 405 in every cluster are computed. For example, the M_DFIW4F for cluster c1, cluster c2 and cluster c3 are computed. The mean DFIW4F values for each cluster can be stored and/or organized in a chart or table, for example chart/table 2100 shown in FIG. 21. At 2030, the clusters are sorted in descending order based upon the mean DFIW4M (M_DFIW4M). If the mean DFIW4M of one cluster is equal to the mean DFIW4M of another cluster, then at 2040 the clusters with the same DFIW4M are sorted in descending order based upon mean DFIW4F. So, for example, FIG. 22 represents a block diagram of the clusters c1, c2, and c3 of the Table 2100 of FIG. 21 sorted in descending order based upon the mean DFIW4M and mean DFIW4F. Other means of sorting the clusters of the Derived Fields 405 are contemplated.

Figure 23:
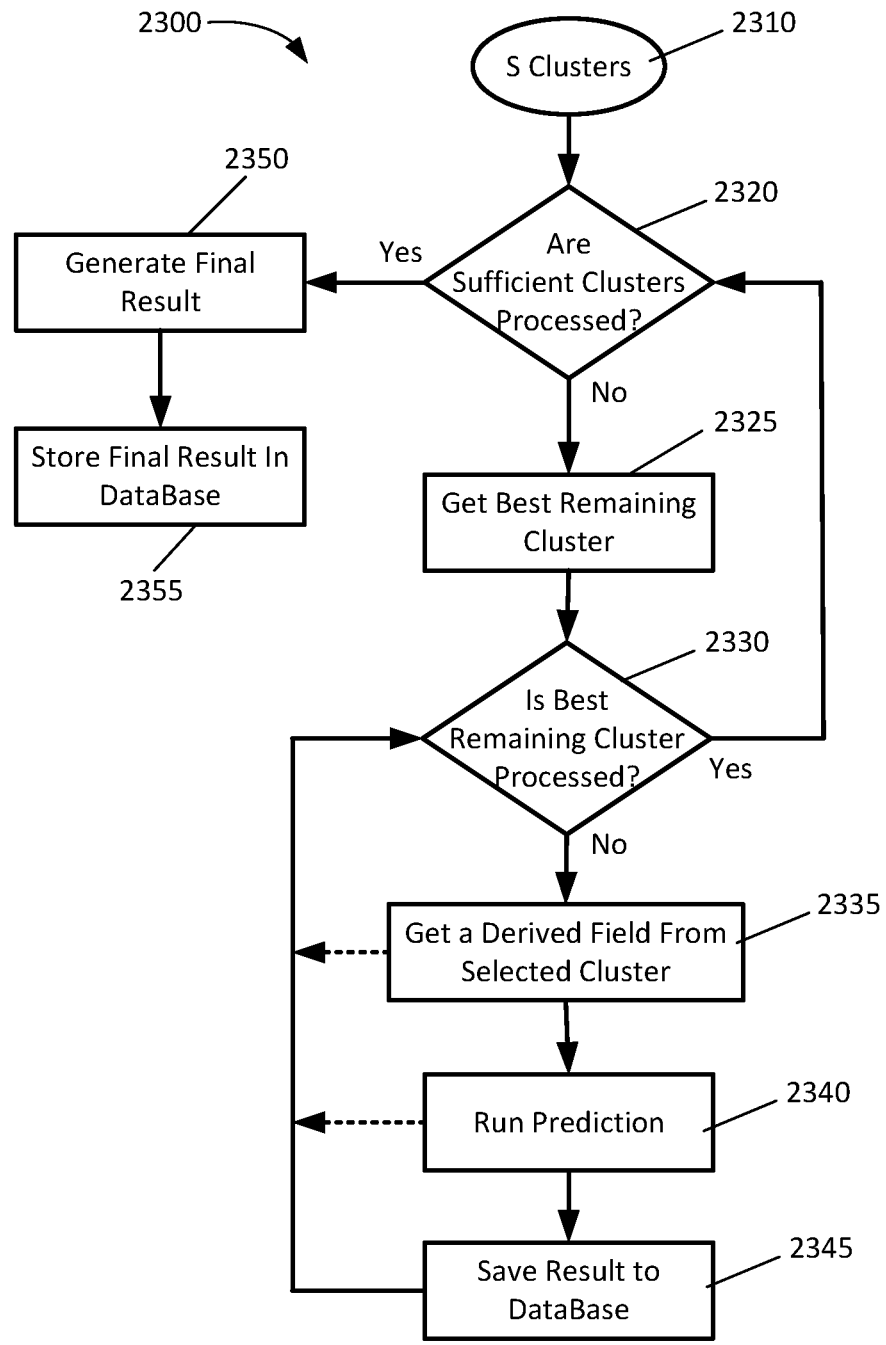
FIG. 23 illustrates a diagrammatic flowchart of a method of running the base machine learning (ML) models based upon Derived Field by best cluster according to an embodiment of the disclosure.

At 645 the base machine learning (ML) models are run based upon the Derived Fields 405 by best cluster. FIG. 23 is an exemplary flowchart in accordance with an embodiment illustrating and describing a method 2300 of running the base ML models based upon the Derived Fields 405 by best cluster. While the method 2300 is described for the sake of convenience and not with an intent of limiting the disclosure as comprising a series and/or a number of steps, it is to be understood that the process 2300 does not need to be performed as a series of steps and/or the steps do not need to be performed in the order shown and described with respect to FIG. 23, but the process 2300 may be integrated and/or one or more steps may be performed together, simultaneously, or the steps may be performed in the order disclosed or in an alternate order.

At 2310, all the clusters (e.g., all S clusters) of the Derived Fields based upon the Mean DFIW4M and Mean DFIW4F are collected and have been sorted in descending order, for example according to process 2000 shown in FIG. 20. At 2320 it is determined whether sufficient number of clusters have been processed. Determining whether sufficient clusters have been processed can be determined in a number of ways. In an illustrative example, whether sufficient clusters have been processed is determined by comparing the number of base ML model predictions to a threshold (e.g., >50%) and if the threshold is met then sufficient clusters/Derived Fields have been processed. For example, if there are 1000 base ML models, and greater than the threshold (501 base ML models or >50%) have the same prediction (e.g., false), then sufficient clusters/Derived Fields have been processed.

If sufficient clusters have not been processed (2320: No), then at 2325 the best remaining cluster (as determined by the sorting process 2000) is obtained or selected and at 2330 it is determined whether the best available remaining cluster has been processed. That is, at 2330 it is determined whether all the Derived Fields 405 in the cluster have been processed (e.g., whether all models and all transformations that use the Derived Fields 405 in the selected cluster have been run). If at 2330 it is determined that the best (remaining) cluster has not been processed, e.g., not all the Derived Fields 405 in the selected cluster have been run (2330: No), then process 2300 continues to 2335 where a Derived Field 405 for the selected cluster is obtained or selected.

At 2335 the Derived Field in the cluster is selected one by one based preferably on the sequence of the Derived Fields 405 in the selected cluster. So, for example, at 2335, the first Derived Field 405 in the selected cluster is selected and at 2340 the base ML models using the selected Derived Field 405 are run and at 2345 a result of the base ML model using the selected Derived Field 405 is obtained and preferably saved to the database. In an embodiment, the result can be the runtime of the base ML model. It can be appreciated that after either one of steps 2335, 2340, or 2345, process 2300 can loop back to 2330 where it will be determined whether all the Derived Fields 405 in the selected cluster have been processed.

If all the derived Fields in the selected cluster have not been processed at 2330 (2330: No), then the process 2300 continues to 2335 where the next Derived Field 405 is selected, to 2340 where the base ML models using the next Derived Field 405 are run, to 2345 where the result(s) are saved to the database. This looping process to 2330 continues until all the Derived Fields 405 in the selected cluster have been processed (2330: Yes) whereupon the process continues to 2320 where it is determined whether sufficient clusters have been processed. If at 2330 not all the clusters were processed (or an insufficient number or not the appropriate Derived Fields have been processed (2320: No), then process 2300 continues to 2325 where the best (remaining) cluster is selected or chosen and process steps 2330, 2335, 2340, & 2345 are performed for all of the Derived Fields 405 in the selected best (remaining) cluster.

If at 2320, sufficient and/or appropriate clusters have been processed (2320: Yes), then at 2350 the final result is generated. At 2350 the final result includes the final prediction of the ensemble ML model. The ensemble ML model will include the base models included in the sufficient and/or appropriate clusters that have been processed. Process 2300 continues where at 2355 the final result is stored in a database.

Figure 24:
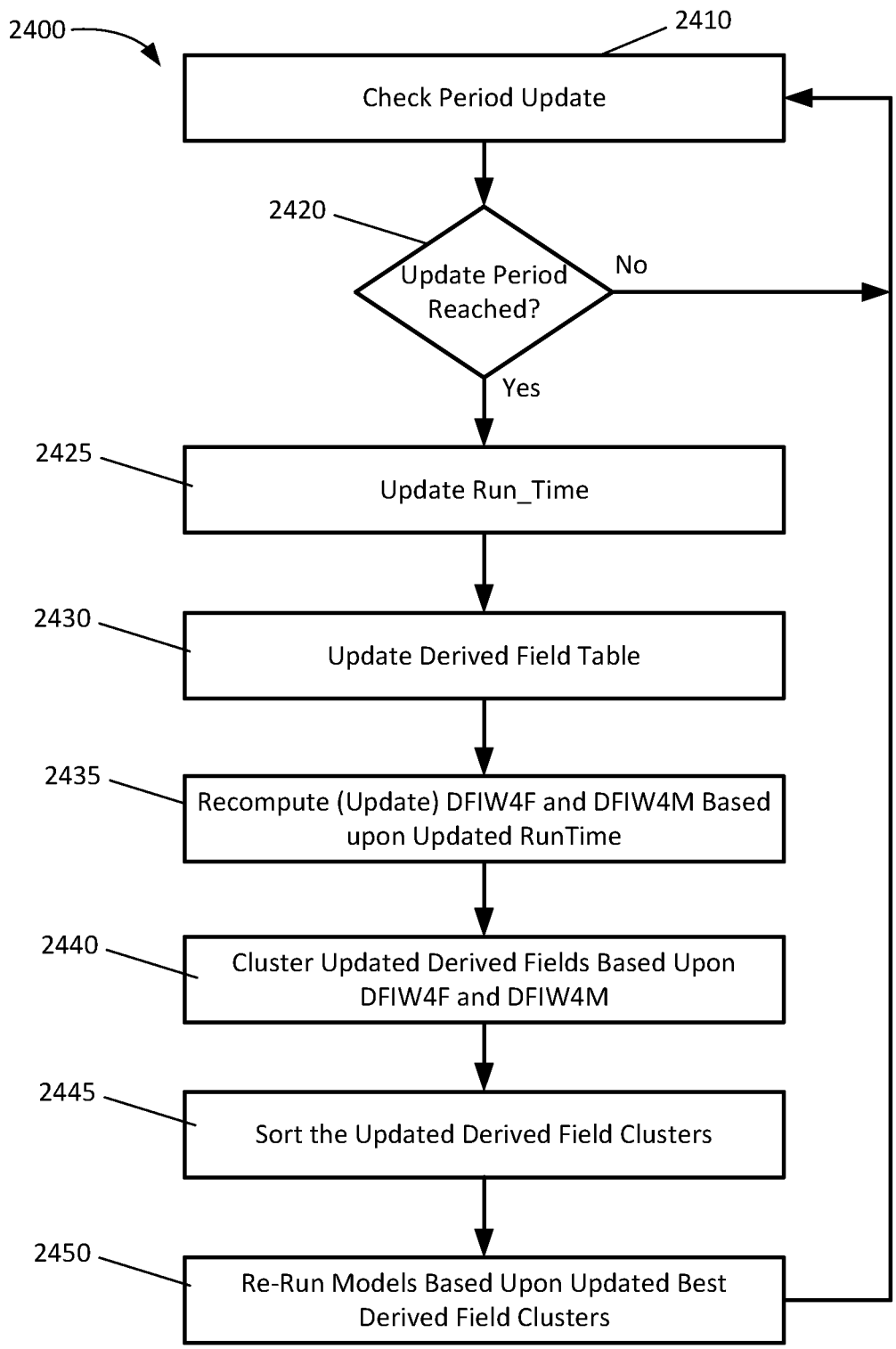
FIG. 24 illustrates a diagrammatic flowchart of a method of running an update of the base machine learning (ML) models based upon an updated Derived Field best cluster analysis according to an embodiment of the disclosure.

FIG. 24 is an exemplary flowchart in accordance with an embodiment illustrating and describing a method 2400 of running an update, including in an embodiment updating the runtime, model importance, and/or Derived Field importance. While the method 2400 is described for the sake of convenience and not with an intent of limiting the disclosure as comprising a series and/or a number of steps, it is to be understood that the process 2400 does not need to be performed as a series of steps and/or the steps do not need to be performed in the order shown and described with respect to FIG. 24, but the process 2400 may be integrated and/or one or more steps may be performed together, simultaneously, or the steps may be performed in the order disclosed or in an alternate order.

At 2410 the update period is checked. For example, the update period can be based upon one or more of: a number of input records, a period of time, and/or a combination of both criteria. At 2420 it is determined whether the update period has been reached. That is, at 2420 it is determined whether the update criteria has been met, e.g., a sufficient passage of time and/or a sufficient number of input records. If at 2420, the update period has not been reached (2420: No) the process 2400 loops back to 2410 and process 2400 proceeds to 2420. Process 2400 continues this looping process until at 2420 it is determined that the update period has been reached (2420: Yes), and then the process 2400 continues to 2425 where the Runtime for the Derived Fields 405 are updated. At 2430 the Derived Field Table (e.g., the Updated Derived Table 585) is updated with the new Run-Times for the Derived Fields 405, and at 2435 the DFIW4F and DFIW4M are recalculated and updated. At 2440, the Derived Fields 405 are re-clustered and updated based upon the updated DFIW4F and DFIW4M. At 2445, the updated clusters of the updated Derived Fields 405 are sorted and at 2450 the base ML models are rerun based upon the Derived Fields 405 in the best updated clusters. That is, in an approach, the RunTime of the Derived Fields 405 are updated and the Updated Derived Field Table is updated based upon the updated RunTime of the Derived Fields and steps 625-645 of process 600 are performed based upon the updated RunTime and Updated Derived Field Table.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment and terminology was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for providing transformations for an ensemble machine learning model comprising:
   providing all of a plurality of base machine learning (ML) models of the ensemble machine learning (ML) model;
   identifying all of a plurality of Derived Fields in all the plurality of base ML models in the ensemble ML model;
   performing a Derived Field run prediction analysis for all of the plurality of Derived Fields;
   computing the Derived Field Importance Weight for Field (DFIW4F) for all of the plurality of Derived Fields;
   computing the Derived Field Importance Weight for Model (DFIW4M) for all of the plurality of Derived Fields;
   clustering all the Derived Fields into a plurality of Derived Field clusters, wherein each Derived Field cluster is based upon the DFIW4M and the DFIW4F for the Derived Field;
   sorting all the Derived Field clusters by best cluster based upon DFIW4M and DFIW4F;
   running the base ML models based upon the Derived Fields in the best Derived Field cluster until sufficient base ML models have been run to output a final prediction of the ensemble ML model wherein the ensemble ML model is optimized to provide a faster final prediction; and
   performing an update comprising:
      updating the run time for all of the plurality of Derived Fields;
      calculating an updated DFIW4M and an updated DFIW4F for all the plurality of Derived Fields;
      clustering all the Derived Fields into a plurality of updated Derived Field clusters based upon the updated DFIW4M and the updated DFIW4F for all the plurality of Derived Fields;
      sorting the updated Derived Field clusters by best cluster based upon the updated DFIW4M and DFIW4F; and
      running the base ML models based upon the updated Derived Fields in the best Derived Field cluster until sufficient base ML models have been run to output an updated final prediction of the ensemble ML model.

2. The computer-implemented method according to claim 1, wherein identifying all the Derived Fields in all the base machine learning models comprises:
   receiving a Derived Field from a base ML model;
   obtaining a function name and type of Derived Field for the received Derived Field;
   obtaining input variables of the received Derived Field;
   obtaining the Derived Field Type of the received Derived Field; and
   computing a number of inputs of the received Derived Field.

3. The computer-implemented method according to claim 2, further comprising:
   receiving all Derived Fields from all the base ML models in the ensemble ML model;
   obtaining a function name and type of Derived Field for all the received Derived Fields from all the base ML models in the ensemble ML model;
   obtaining input variables of all the received Derived Fields from all the base ML models in the ensemble ML model;
   obtaining the Derived Field Type of all the received Derived Fields from all the base ML models in the ensemble ML model; and
   computing a number of inputs of all the received Derived Fields from all the base ML models in the ensemble ML model.

4. The computer-implemented method according to claim 2, further comprising:
   selecting one of the Derived Fields;
   determining whether the input variables of the selected Derived Field being the same as the input variables of at least one of the other Derived Fields;
   determining, in response to the input variables of the selected Derived Field being the same as the input variables of the at least one of the other Derived Fields, whether a function of the selected Derived Field is the same as a function of the at least one other Derived Field;
   saving, in response to the function of the selected Derived Field is the same as the function of the at least one other Derived Field, the selected Derived Field to a Similarity Queue and removing the selected Derived Field from a Derived Field Table;
   determining, in response to the function of the selected Derived Field not being the same function as the at least one other derived Field that has the same input variables, whether the selected Derived Field and the at least one other Derived Field that has the same input variables is similar to the at least one other Derived Field; and
   saving, in response to the selected Derived Field being similar to the at least one other Derived Field that has the same input variables, the selected Derived Field to the Similarity Queue and removing the selected Derived Field from the Derived Field Table.

5. The computer-implemented method according to claim 1, further comprising:
   generating a Derived Field Record;
   generating a Derived Field Table having an entry for every Derived Field; and
   storing the Derived Field Record and the Derived Field Table.

6. The computer-implemented method according to claim 1, further comprising:
   generating X input values for one or more Input Variables for each Derived Field;
   running each Derived Field using the X input values generated for the one or more Input Variables for each Derived Field;
   determining a run time for each of X runs of each Derived Field using one of the X input values generated for the one or more Input Variables for each Derived Field;
   computing a mean run time for the X runs of each Derived Field; and
   storing the mean run time for the X runs of each Derived Field in at least one of a group consisting of a Derived Field Record, a Derived Field Table, and a combination thereof.

7. The computer-implemented method according to claim 1, further comprising performing a Derived Field similarity analysis.

8. The computer-implemented method according to claim 1, further comprising computing the DFIW4F for all of the plurality of Derived Fields according to the formula:

$$DFIW4F_N = \\ DFRT_{N\_1}/\left(\sum_{d=1}^{K}(DFRT_d)\right)/K + DFRT_{N\_2}/\left(\sum_{d=1}^{M}(DFRT_d)\right)/M + \ldots + \\ DFRT_{N\_y}/\left(\sum_{d=1}^{N}(DFRT_d)\right)/N$$

wherein $DFRT_{N\_y}$ is the run time of a Derived Field, where a first subscript N in $DFRT_{N\_y}$ is an index of the Derived Field, a second subscript y in $DFRT_{N\_y}$ is the last index of the base ML model, and N is the number of Derived Fields.

9. The computer-implemented method according to claim 1, further comprising:
   receiving a plurality of Derived Field Records;
   determining whether all the plurality of Derived Field Records have been used to calculate a contribution weight for every base ML model;
   forecasting, in response to not all the Derived Field Records being used to calculate a value number for every base ML model, an output of each current base ML model by running each current base ML model using one of the plurality of Derived Field records that have not been used to calculate a Tnm value number;
   comparing the forecasted output of each current base ML model using the one of the plurality of Derived Field Records that have not been used to calculate a Tnm value number to a final predicted value of the ensemble ML model using the one of the plurality of Derived Field Records that have not been used to calculate a Tnm value;
   assigning, in response to the forecasted output of the current base ML model, using the one of the Derived Records that have not been used to calculate a Tnm value number, being equal to the final predicted value of the ensemble base ML Model, using the one of the Derived Records that have not been used to calculate a Tnm value number, a Tnm value number of 1;
   assigning, in response to the forecasted output of the current base ML model, using the one of the Derived Records that have not been used to calculate a Tnm value number, not being equal to the final predicted value of the ensemble ML Model, using the one of the Derived Records that have not been used to calculate a Tnm value number, a Tnm value number of 0; and
   computing the contribution weight for each base ML model based upon the formula:

$$A_n = (\Sigma_{m=1}{}^W(T_{nm}))/W$$

where $A_n$ is the contribution weight of base ML model n, n is the model number of the base ML model in the ensemble ML model where the ensemble ML model has W base ML models in the ensemble ML model.

10. The computer-implemented method according to claim 9, further comprising:
    obtaining a Derived Field;
    obtaining the contribution weight for each base ML model; and
    calculating the DFIW4M for each of the Derived Fields using the formula:

$$DFIW4M_w = (\Sigma_{m=1}{}^P(MW_{wm}))/P$$

where W is the number of the base ML model in the ensemble ML model where the ensemble ML model has P base ML models.

11. The computer-implemented method according to claim 10, further comprising computing the DFIW4F for all the Derived Fields according to the formula:

$$DFIW4F_N = \\ DFRT_{N\_1}/\left(\sum_{d=1}^{K}(DFRT_d)\right)/K + DFRT_{N\_2}/\left(\sum_{d=1}^{M}(DFRT_d)\right)/M + \ldots + \\ DFRT_{N\_y}/\left(\sum_{d=1}^{N}(DFRT_d)\right)/N$$

wherein $DFRT_{N\_y}$ is the run time of a Derived Field, where a first subscript w in $DFRT_{N\_y}$ is an index of the Derived Field, a second subscript y in $DFRT_{N\_y}$ is the last index of the base ML model, and N is the number of Derived Fields.

12. The computer-implemented method according to claim 11, further comprising creating a Derived Field weight table wherein for each Derived Field an associated DFIW4M is identified and an associated DFIW4F is identified.

13. The computer-implemented method according to claim 11, further comprising:
    computing a mean DFIW4M for all the Derived Fields in each Derived Field cluster created as a result of clustering the Derived Fields based upon DFIW4M and DFIW4F;
    computing a mean DFIW4F for all Derived Fields in each Derived Field cluster created as a result of clustering the Derived Fields based upon DFIW4M and DFIW4F;
    sorting the plurality of Derived Field clusters in descending order based upon the mean DFIW4M for all the Derived Fields in each cluster; and
    sorting, in response to the mean DFIW4M for one of the plurality of Derived Field clusters equaling the mean DFIW4M for another one of the plurality of Derived Field clusters, the Derived Field clusters having equal DFIW4M by mean DFIW4F for all of the plurality of Derived Fields.

14. The computer-implemented method according to claim 1, further comprising associating each Derived Field with a cluster label based upon the cluster associated with the Derived Field as a result of clustering the Derived Fields into a plurality of clusters based upon DFIW4F and DFIW4M; and creating a cluster table having an entry for each Derived Field and providing the cluster label associated with each respective Derived Field.

15. The computer-implemented method according to claim 1, wherein running the base ML models based upon the Derived Fields in the best Derived Field cluster until sufficient base ML models have been run comprises:
- determining if a sufficient number of Derived Field clusters have been processed;
- selecting, in response to determining that a sufficient number of Derived Field clusters have not been processed, a best remaining Derived Field cluster that has not been processed;
- determining whether all Derived Fields in the selected best remaining Derived Field cluster have been processed;
- choosing, in response to all Derived Fields in the selected best remaining Derived Field cluster not being processed, a chosen Derived Field from the selected best remaining Derived Field cluster;
- running the base ML models using the chosen Derived Field; and
- saving a result of the base ML model runs using the chosen Derived Field.

16. The computer-implemented method according to claim 15, further comprising:
- choosing a chosen Derived Field from the selected best remaining Derived Field cluster;
- running the base ML models using the chosen Derived Field; and
- saving the result of the base ML model runs using the chosen Derived Field until all Derived Fields from the selected best remaining Derived Field cluster have been processed.

17. The computer-implemented method according to claim 16, further comprising determining, in response to and after determining that all of the Derived Fields from the selected best remaining Derived Field cluster have been processed, whether a sufficient number of Derived Field clusters have been processed; and selecting a best remaining Derived Field cluster that has not been processed.

18. The computer-implemented method according to claim 15, wherein the Derived Field in the Derived Field cluster is selected one by one based on the sequence of the Derived Fields in the selected best remaining cluster.

19. The computer-implemented method according to claim 15, wherein determining whether sufficient clusters have been processed comprises:
- comparing the number of base ML model predictions to a threshold; and
- if the number of base ML model predictions that are correct or incorrect exceeds the threshold, then a sufficient number of clusters have been processed; and
- the method further comprises generating, in response to determining that a sufficient clusters have been processed, a prediction of a resulting ensemble ML model using the base ML models in the sufficient clusters.

* * * * *